United States Patent
Patil et al.

(10) Patent No.: US 11,689,943 B2
(45) Date of Patent: Jun. 27, 2023

(54) NETWORK FUNCTION REDUNDANCY USING BINDING HEADER ENHANCEMENTS

(71) Applicant: Verizon Patent and Licensing Inc., Basking Ridge, NJ (US)

(72) Inventors: Sudhakar Reddy Patil, Flower Mound, TX (US); James Mathison, Warren, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 288 days.

(21) Appl. No.: 17/204,374

(22) Filed: Mar. 17, 2021

(65) Prior Publication Data

US 2022/0303793 A1 Sep. 22, 2022

(51) Int. Cl.
| | |
|---|---|
| H04W 24/04 | (2009.01) |
| H04W 36/26 | (2009.01) |
| H04L 69/40 | (2022.01) |
| H04L 69/22 | (2022.01) |
| H04W 76/19 | (2018.01) |

(52) U.S. Cl.
CPC ............ *H04W 24/04* (2013.01); *H04L 69/22* (2013.01); *H04L 69/40* (2013.01); *H04W 36/26* (2013.01); *H04W 76/19* (2018.02)

(58) Field of Classification Search
CPC ..... H04W 24/04; H04W 76/19; H04W 36/26; H04W 76/18; H04L 69/22; H04L 69/40
See application file for complete search history.

(56) References Cited

U.S. PATENT DOCUMENTS

2022/0053372 A1* 2/2022 Shekhar ............. H04L 67/1001

OTHER PUBLICATIONS

3GPP TS 29.500, V16.4.0 (Year: 2020).*

* cited by examiner

*Primary Examiner* — Mandish K Randhawa

(57) ABSTRACT

A first network function (NF) instance sends a request for a session to a second NF instance. The first NF instance receives a response, from the second NF instance, that includes a binding header that includes a failover mode identifier, a designated number of retry attempts, and a retry mode. The first NF instance sends a second request for the session to the second NF instance. The first NF instance determines if an error or a timed out response has occurred subsequent to sending the second request to the second NF instance, and re-sends, in response to the error or timed out response, the second request based on the failover mode identifier, the designated number of retry attempts and the retry mode from the binding header.

20 Claims, 18 Drawing Sheets

NETWORK FUNCTION REDUNDANCY USING BINDING HEADER ENHANCEMENTS

BACKGROUND

As networks move to a Software Defined Network (SDN) model, dedicated hardware devices/components that have traditionally implemented particular network functions are being replaced by virtual network functions (VNFs). VNFs include network functions that have been moved into software that runs on commodity hardware. VNFs may be executed as one or more virtual machines (VMs) on top of the hardware networking infrastructure. VNFs typically increase network scalability and agility, while enabling better use of network resources. VNFs additionally reduce power consumption and reduce the use of available physical space due to the VNFs replacing physical hardware. VNFs, thus, reduce operational and capital costs.

VNFs can be considered as building blocks and can be connected or combined together to provide multiple capabilities required to provide a networking communication service. For example, VNFs can be linked together in a process known as service chaining. Traditionally, new network services and functions have been installed manually and configured within dedicated hardware devices. VNFs, however, eliminate the need for the installation of specific hardware since new functions can be quickly deployed as one or more VMs. Examples of various VNFs include switches, routers, servers, tunneling gateway elements, traffic analysis functions, mobile network nodes or functions (e.g., Home Location Register, Home Subscriber Server, Mobility Management Entity, Serving General Packet Radio Services (GPRS) Support Node, Gateway GPRS Support Node, Policy Control Function, User Plane Function, Session Management Function, Access and Mobility Management Function, User Data Management Function), and security functions (e.g., firewalls, intrusion detection systems, virus scanners, spam protection).

DETAILED DESCRIPTION OF THE PREFERRED EMBODIMENTS

Figure 1:
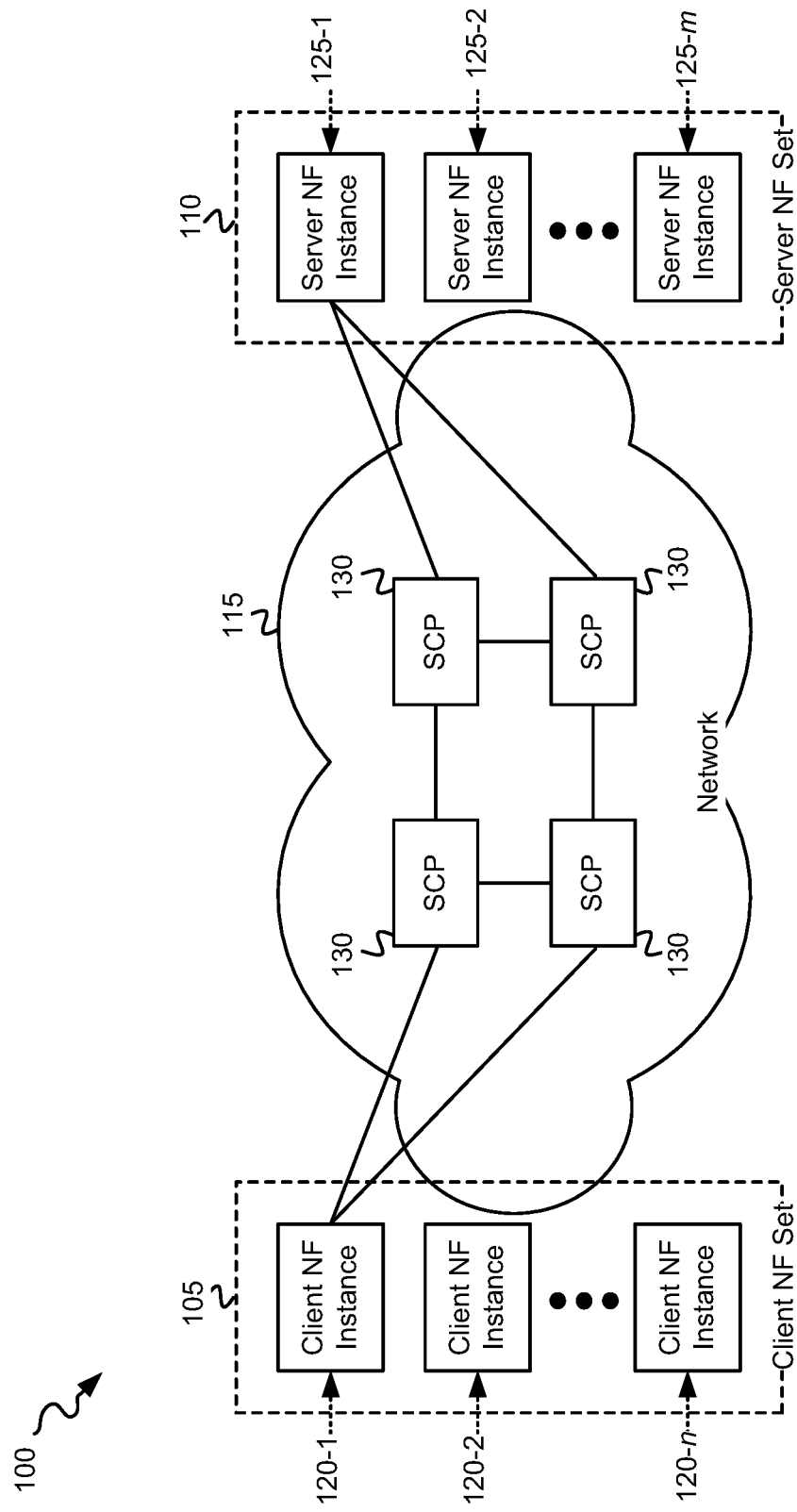
FIG. 1 depicts an exemplary network environment in which enhanced binding headers may be used to implement VNF redundancy.

The following detailed description refers to the accompanying drawings. The same reference numbers in different drawings may identify the same or similar elements. The following detailed description does not limit the invention.

Network functions virtualization (NFV) is a network architecture that virtualizes classes of VNFs into building blocks that may connect, or chain together, to create network services. Network services have traditionally run on proprietary, dedicated hardware. With NFV, VNFs are packaged as VMs on commodity hardware. A NFV architecture typically includes a network functions virtualization infrastructure (NFVI) and a network functions virtualization management and orchestration architectural framework (NFV-MANO). NFVI includes the hardware and software components that build the environment where VNFs are deployed. The NFVI can span several different locations, with connectivity between the locations. The NFV-MANO includes a collection of functional blocks, data repositories, and interfaces through which the functional blocks of the NFV-MANO exchange information to manage and orchestrate the NFVI and VNFs.

"Cloud-native" is a type of NFV architecture for managing and orchestrating VNFs within a distributed cloud environment. In a cloud-native architecture, software is containerized, with each part of an application being packaged in its own "container." A container is a standard unit of software that packages code and its dependencies, libraries, other binaries, and configuration files so that the application can run reliably in multiple computing environments. Additionally, in a cloud-native architecture, the containerized software is dynamically orchestrated and managed to optimize resource utilization. The containerized software is further micro-services oriented to increase the agility and maintainability of the applications within the distributed cloud environment. Cloud-native VNFs typically have Application Programming Interfaces (APIs) which enable: 1) automated installation and configuration; 2) automated scaling based on dynamic requirements; 3) self-healing or fault tolerance; 4) automated monitoring and analysis of VNFs for errors, capacity management, and performance; and 5) automated upgrading and updating of the VNFs to provide new releases and apply patches. Cloud-native VNFs, therefore, are differentiated from traditional VNFs in their self-management capability and improved scalability.

Cloud-native architectures can implement redundancy concepts that enable execution of failover processes when errors or failures occur between communicating instances of VNFs. In a cloud-native architecture, sets of VNFs may exist, where each set of VNFs may include a group of equivalent NF instances that can be used interchangeably to perform the same function, operation, or service. Each set of VNFs may include one or more client VNF instances (also called "consumer VNF instances) and/or one or more server VNF instances (also called "producer VNF instances"). In the cloud-native architecture, specialized VNFs, called Service Communication Proxies (SCPs), may be implemented to route messages between client and server VNF instances during sessions. The SCPs may attempt communication retries and alternate message routing to accommodate failures and overload conditions.

To assist in implementing redundancy in a cloud-native architecture, each client or server VNF instance may use a message "binding header" to inform the other end of a session where subsequent messages may be sent. For example, the binding header from a server VNF instance may specify that a client VNF instance may send subsequent messages for a session only to that particular server VNF instance, or that the client VNF instance may send subsequent messages to any server VNF instance within a particular server VNF set. In the cloud-native architecture, each client and server VNF instance may further use a "routing binding header" to inform the SCPs that is/are responsible for routing messages for a session where the messages may be sent in the event of failures or overload conditions.

Current redundancy mechanisms in cloud-native architectures assume that all VNFs operate in an active-active mode, when in actuality some VNFs and/or entire VNF sets may instead operate in an active-standby mode. In active-active mode, each VNF instance of a VNF set has access to a replicated database giving each VNF instance access to, and usage of, an application. In a VNF set where all VNF instances operate in an active-active mode, requests/commands are load-balanced across all available VNF instances in the VNF set. When a failure occurs on a particular VNF instance, another VNF instance in the VNF set takes its place. In an active-standby mode, however, only one VNF instance in the VNF set is in active mode while other VNF instances in the VNF set are in standby mode. The active mode VNF instance and the standby VNF instance or instances may synchronize with one another to facilitate the switching of message handling from the active mode VNF instance to the standby VNF instance in the event of a failure or overload condition with the active mode VNF instance.

As a simplified example of current cloud-native redundancy mechanisms, if VNF1 and VNF2 are in a VNF set, then VNF1 and VNF2 are assumed interchangeable at all points in time. If a message is sent to VNF1 but cannot be delivered, then current redundancy mechanisms assume that the message can be delivered to VNF2, which can then correctly handle/process the message. In many cases, such an assumption is correct, but there are some cases where a VNF cannot operate in active-active mode and instead must operate in active-standby mode. When a pair of VNFs are operating in active-standby mode, only the currently active node can process commands/requests. If a command/request is instead sent to the standby node of the pair, the standby node may be unable to process the command and may return an error code.

In mobile networks, such as some Fifth Generation (5G) core networks, some VNFs operate in active-active mode while other VNFs operate in active-standby mode. Communication retries, communication failures, and rerouting around overload conditions need to be performed differently for active-active VNF instances and VNF sets versus active-standby VNF instances and VNF sets. There is, however, currently no mechanism to coordinate failover behavior between client VNF instances, server VNF instances, and SCPs in 5G core networks that employ VNF instances or VNF sets operating in active-standby mode.

Exemplary implementations described herein enhance binding headers contained in client to server, server to client, client to SCP, and server to SCP messages such that a client NF instance or a server NF instance can inform the SCPs and/or the other end of a session of how they should handle failure scenarios, including communication retries, communication failures, and/or rerouting around overload conditions. As described herein, the content of the binding headers in messages is modified to identify the failover mode of a VNF set or a VNF instance, to specify a maximum number of messaging retries to be attempted, and/or to specify a particular retry mode for a session. The newly added retry mode in the binding header indicates to which VNF instance one or more retries may be made, during a session, after a first unsuccessful messaging attempt, and whether additional retries should subsequently be made to other VNF members of a VNF set.

FIG. 1 depicts an exemplary network environment 100 in which enhanced binding headers may be used to implement VNF redundancy. As shown, network environment 100 includes a client NF set 105, a server NF set 110, and a network 115. Client NF set 105 includes multiple client VNF instances 120-1 through 120-n (referred to herein as "client NF instance 120" or "client NF instances 120"). The client NF instances 120 within the set 105 may be considered equivalent and can be used interchangeably.

Server NF set 110 includes multiple server VNF instances 125-1 through 125-m (referred to herein as "server NF instance 125" or "server NF instances 125"). The server NF instances 125 within the set 110 may be considered equivalent and can be used interchangeably to perform one or more functions, operations, or services for a client NF instance 120.

Network 115 may include one or more networks of various types including, for example, a Public Switched Telephone Network (PSTN), a wireless network, a LAN, a wide area network (WAN), a metropolitan area network (MAN), an intranet, or the Internet. The wireless network may include a satellite network, a Public Land Mobile Network (PLMN), and/or a wireless LAN or WAN (e.g., Wi-Fi). As shown, network 115 may include one or more SCPs 130. Each SCP 130 includes a specialized NF that can route messages between client NF instances 120 and server NF instances 125 and may also implement communication re-tries and alternate routing, based on the enhanced message binding headers described herein, to deal with messaging failure and overload conditions.

The configuration of components of network environment 100 in FIG. 1 is for illustrative purposes. Other configurations may be implemented. Therefore, network environment 100 may include additional, fewer and/or different components that may be configured in a different arrangement from that depicted in FIG. 1.

Figure 2:
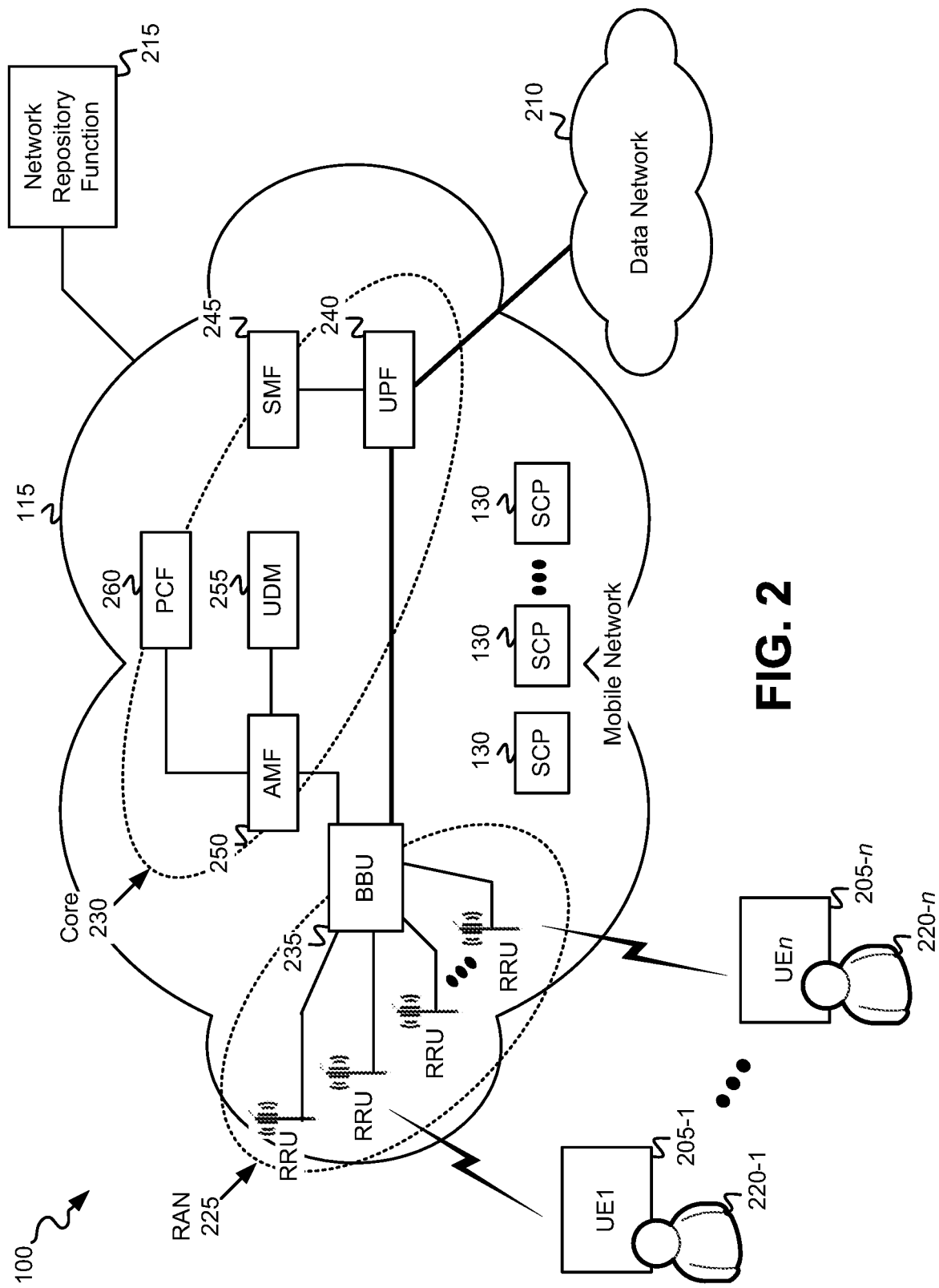
FIG. 2 depicts an example of a network environment that includes a mobile network.

FIG. 2 depicts an example of the network environment 100 of FIG. 1 in which network 115 includes a PLMN (referred to herein as a "mobile network"). As shown, the example network environment 100 may include user equipment devices (UEs) 205-1 through 205-n, mobile network 115, a data network 210, and a network repository function (NRF) 215.

UEs 205-1 through 205-n (referred to herein as a "UE 205" or "UEs 205") may each include any type of device having a wireless communication capability. UEs 205 may include, for example, a laptop, palmtop, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 205. A user 220-1 is shown in association with UE 205-1 and a user 220-n is shown in association with UE 205-n.

Mobile network 115 may include a Radio Access Network (RAN) 225 and a core network 230. RAN 225 may include various types of radio access equipment that implement Radio Frequency (RF) communication with UEs 205. The radio access equipment of RAN 125 may include, for example, multiple Remote Radio Units (RRUs) and at least one baseband unit (BBU) 235 (only a single BBU 235 is shown in FIG. 2, however, RAN 225 may include multiple BBUs). Each of the RRUs includes a device(s) that operates as a radio function unit which transmits and receives RF signals to/from UEs 205. BBU 235 interconnects with the distributed RRUs of RAN 225 via fronthaul links or a fronthaul network. RAN 225 may additionally include other nodes, functions, and/or components not shown in FIG. 2.

Core network 230 includes devices or nodes that perform network functions that operate the mobile network 115 including, among other network functions, mobile network access management, session management, and policy control. In the example network environment 100 of FIG. 2, core network 230 is shown as including a Fifth Generation (5G) mobile network that further includes 5G NFs, such as a User Plane Function (UPF) 240, a Session Management Function (SMF) 245, an Access and Mobility Management Function (AMF) 250, a Unified Data Management (UDM) function 255, and a Policy Control Function (PCF) 260. UPF 240, SMF 245, AMF 250, UDM 255, and PCF 260 may be implemented as VNFs within mobile network 115, and may operate as the client NF instances 120 or the server NF instances 125 depicted in FIG. 1 under certain circumstances.

UPF 240 acts as a router and a gateway between mobile network 115 and data network 210, and forwards session data between data network 210 and RAN 225. Though only a single UPF 240 is shown in FIG. 2, mobile network 115 may include multiple UPFs 240 at various locations in network 115. SMF 245 performs session management, allocates network addresses to UEs 205, and selects and controls UPFs 240 for data transfer. AMF 250 performs authentication, authorization, and mobility management for UEs 205. UDM 255 manages data for user access authorization, user registration, and data network profiles. UDM 255 may include, or operate in conjunction with, a User Data Repository (UDR—not shown) which stores user data, such as customer profile information, customer authentication information, and encryption keys. PCF 260 implements policy and charging control for service data flows and Protocol Data Unit (PDU) session related policy control.

Data network 210 may include one or more interconnected networks, such as local area networks (LANs), wide area networks (WANs), metropolitan area networks (MANs), and/or the Internet. Data network 210 connects with UPF 240 of the core network 230 of mobile network 115.

NRF 215 includes one or more network devices that connect to mobile network 115 and operates as a centralized repository of information regarding NFs in mobile network 115. NRF 215 enables NFs (e.g., UPF 240, SMF 245, AMF 250) to register and discover each other via an Application Programming interface (API). NRF 215 maintains an updated repository of information about the NFs available in mobile network 115, along with information about the services provided by each of the NFs. NRF 215 further enables the NFs to obtain updated status information of other NFs in mobile network 115. NRF 215 may, for example, maintain profiles of available NF instances and their supported services, allow NF instances to discover other NF instances in mobile network 115, and allow NF instances to track the status of other NF instances. In some implementations, NRF 215 may be a virtual entity implemented by one or more devices within mobile network 115, such as a device implementing AMF 250, a device implementing SMF 245, and/or a device implementing PCF 260.

As shown in FIG. 2, mobile network 115 may include the SCPs 130 described above with respect to FIG. 1. Each of the NFs UPF 240, SMF 245, AMF 250, UDM 255, and PCF 260 may act as a client NF instance 120 or a server NF instance 125 described above with respect to FIG. 1. For example, AMF 250 may act as a client NF instance 120 that requests policy information from PCF 260, which further acts as a server NF instance 125 when supplying the policy information to AMF 250. Each of the NFs acting as a client NF instance 120 may communicate via one or more SCPs 130 that operate to route messages to a target server NF instance 125.

The configuration of network components of the example network environment 100 of FIG. 2 is for illustrative purposes. Other configurations may be implemented. Therefore, network environment 100 may include additional, fewer, and/or different components that may be configured in a different arrangement than that depicted in FIG. 2. For example, core network 230 may include other NFs not shown in FIG. 4. As a further example, though mobile network 115 is depicted in FIG. 2 as a 5G network having 5G network components/functions, mobile network 115 may alternatively include a 4G or 4.5G network with corresponding network components/functions, or a hybrid 5G/4G network that includes certain components of both a Next Generation network (e.g., a 5G network) and a 4G network. As another example, though NRF 215 is shown in FIG. 2 as being connected to mobile network 115, in alternative implementations NRF 215 may instead connect to data network 210.

Figure 3:
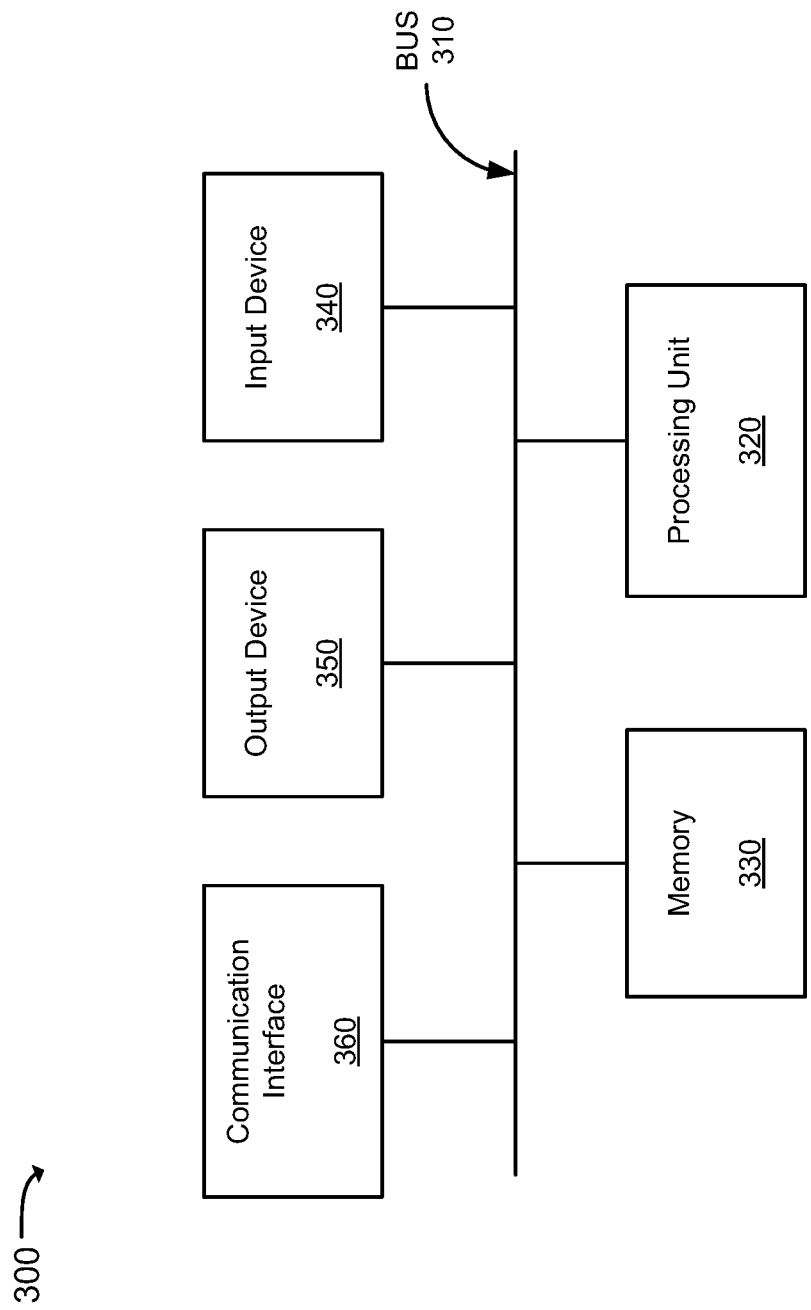
FIG. 3 is a diagram that depicts exemplary components of a device that may correspond to devices and network functions (NFs) shown in FIGS. 1 and 2.

FIG. 3 is a diagram that depicts exemplary components of a device 300. UEs 205, the RRUs of RAN 225, BBU 235, and NRF 215 may include components that are the same as, or similar to, those of device 300 shown in FIG. 3. Furthermore, each of the network functions UPF 240, SMF 245, AMF 250, UDM 255 and PCF 260 of core network 235 may be implemented by a network device that includes components that are the same as, or similar to, those of device 300. Some of NFs UPF 240, SMF 245, AMF 250, UDM 255 and PCF 260 may be implemented by a same device 300 within mobile network 115, while others of the functions may be implemented by one or more separate devices 300 within mobile network 115.

Device 300 may include a bus 310, a processing unit 320, a memory 330, an input device 340, an output device 350, and a communication interface 360. Bus 310 may include a path that permits communication among the components of device 300. Processing unit 320 may include one or more processors or microprocessors, or processing logic, which may interpret and execute instructions. Memory 330 may include one or more memory devices for storing data and instructions. Memory 330 may include a random access memory (RAM) or another type of dynamic storage device that may store information and instructions for execution by processing unit 320, a Read Only Memory (ROM) device or another type of static storage device that may store static information and instructions for use by processing unit 320, and/or a magnetic, optical, or flash memory recording and storage medium. The memory devices of memory 330 may each be referred to herein as a "tangible non-transitory computer-readable medium," "non-transitory computer-readable medium," or "non-transitory storage medium." In some implementations, the processes/methods set forth herein can be implemented as instructions that are stored in memory 330 for execution by processing unit 320.

Input device 340 may include one or more mechanisms that permit an operator to input information into device 300, such as, for example, a keypad or a keyboard, a display with a touch sensitive panel, voice recognition and/or biometric mechanisms, etc. Output device 350 may include one or more mechanisms that output information to the operator, including a display, a speaker, etc. Input device 340 and output device 350 may, in some implementations, be implemented as a user interface (UI) that displays UI information and which receives user input via the UI. Communication interface 360 may include a transceiver(s) that enables device 300 to communicate with other devices and/or systems. For example, communication interface 360 may include one or more wired and/or wireless transceivers for communicating via mobile network 115 and/or data network 210. In the case of RRUs of RAN 225, communication interface 360 may further include one or more antenna arrays for producing radio frequency (RF) cell sectors.

The configuration of components of device 300 illustrated in FIG. 3 is for illustrative purposes. Other configurations may be implemented. Therefore, device 300 may include additional, fewer and/or different components than those depicted in FIG. 3.

Figure 4A:
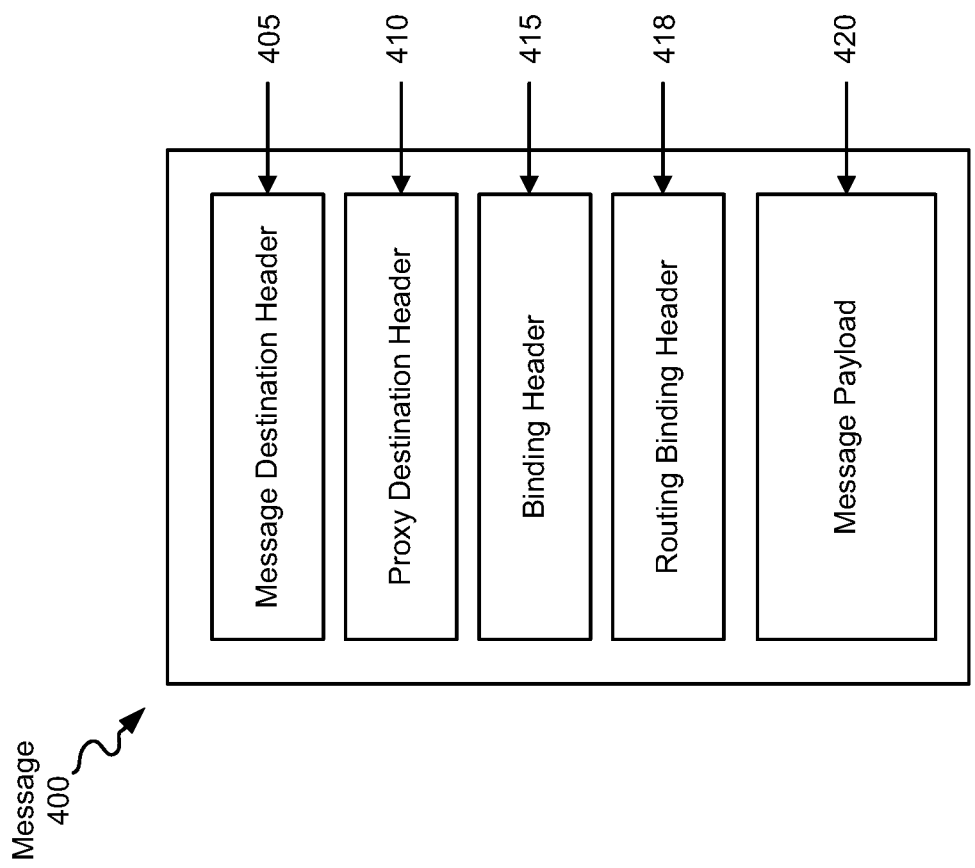
FIG. 4A illustrates an exemplary message format for messaging between client NF instances, server NF instances, and Service Communication Proxies.

FIG. 4A illustrates an exemplary message 400 that may be used for sending message data (e.g., requests, commands, or responses) between client NF instances 120, server NF instances 125, and SCPs 130. Message 400 may include a message destination header 405, a proxy destination header 410, a binding header 415, a routing binding header 418, and a message payload 420. In the example network environment 100 of FIG. 2, in which network 115 includes a mobile network, messages 400 may be sent between network functions (e.g., between SMF 245, AMF 250, UDM 255, PCF 260, and/or SCP 130) as Control Plane (CP) messaging.

Message destination header 405 includes data that indicates the ID or network address of the client NF instance 120 or server NF instance 125 that is the endpoint destination of the message 400. Proxy destination header 410 includes data that indicates the ID or network address of the proxy device (e.g., a SCP 130) that serves as an intermediate node, between the message source and the message destination, which routes the message from the message source towards the message destination indicated in message destination header 405.

Binding header 415 may include a "client binding header" or a "server binding header." A "client binding header," as referred to herein, includes a binding header 415 sent in a message 400 from a client NF instance 120 that instructs the session endpoint server NF instance 125 where and how to send messages for the session. A "server binding header," as referred to herein, includes a binding header 415 sent in a message 400 from a server NF instance 125 that instructs the session endpoint client NF instance 120 where and how to send messages for the session.

Routing binding header 418 includes header data sent from either a client NF instance 120 or a server NF instance 125 in a message 400 that instructs an intermediate proxy device, such as a SCP 130, how to route messages for a session if an error, or timed out message, occurs when the forwarding of a message is attempted by the intermediate proxy device during the session between a source and a destination.

Binding header 415 and routing binding header 418 include binding header data, associated with a client binding header, a server binding header or a routing binding header and described in further detail below with respect to FIG. 4B, that provides instructions for the message destination identified in header 405 to send subsequent messages for the session, including instructions for the message retry mode, message re-try attempts and message rerouting. The binding header 415 and/or routing binding header 418 may be included in certain messages, and may be omitted from other messages. For example, when setting up a session between a client NF instance 120 and a server NF instance 125, a client binding header may be included in the initial message from the client NF instance 120, and a server binding header may be included in the initial response from the server NF instance 125. Subsequent messages for the session between the client NF instance 120 and the server NF instance 125 may omit the client binding header and/or the server binding header.

Message payload 420 includes data that is the payload of the message. Message payload 420 may include, for example, message data specifying the particular request, command, or response sent from the client NF instance 120 or the server NF instance 125.

Figure 4B:
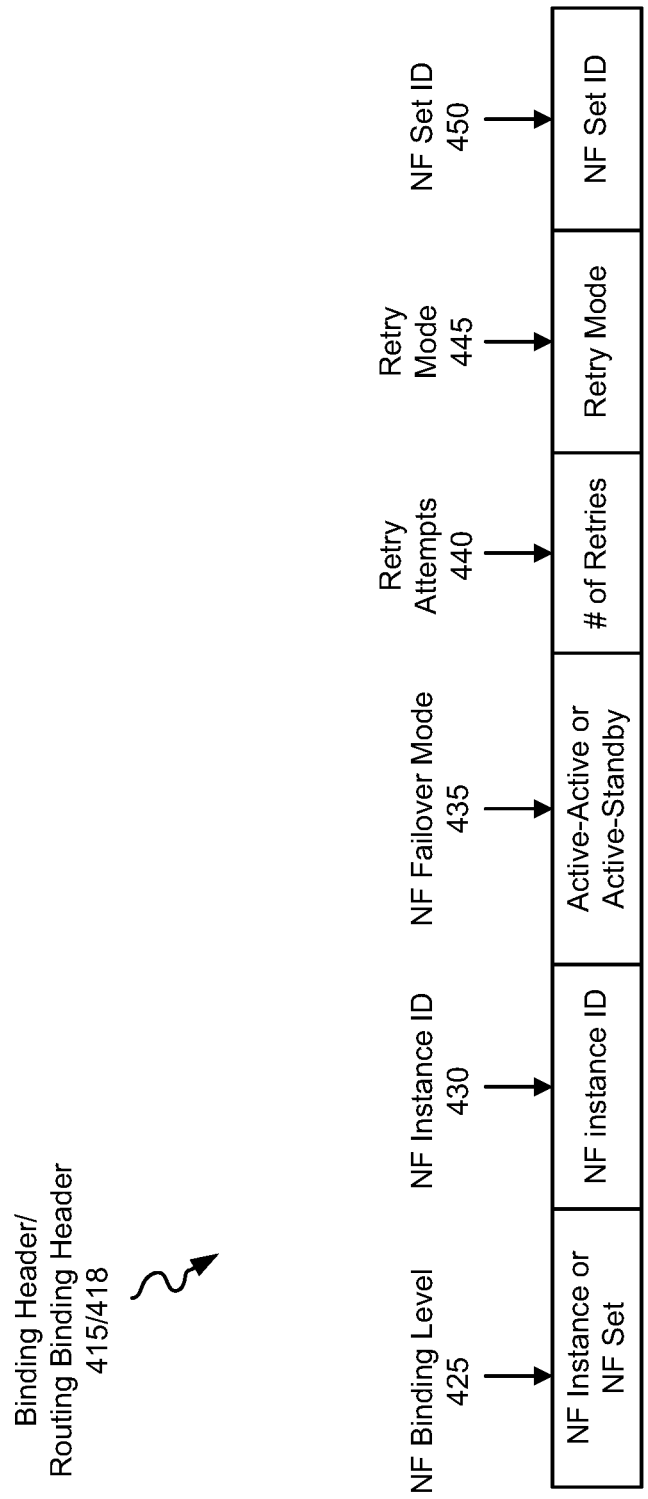
FIG. 4B depicts an example of an enhanced binding header that may be used for implementing VNF redundancy.

FIG. 4B depicts an example of an enhanced binding header 415 or a routing binding header 418 that may be used, as described herein, for implementing VNF redundancy. Binding header 415 and/or routing binding header 418 may be attached to a message 400 sent from a client NF instance 120 to a server NF instance 125 (e.g., a client binding header), from a server NF instance 125 to a client NF instance 120 (e.g., a server binding header), or from a client NF instance 120 or server NF instance 120 to a SCP 130 (e.g., a routing binding header) The enhanced binding header 415 or routing binding header 418, as described further below, includes, among other fields, fields that specify whether a client NF instance 120 or server NF instance 125 is operating in an "active-active" or "active-standby" failover mode, a number of retry attempts that should be attempted when a messaging failure occurs, and a retry mode that specifies one of multiple different retry modes to be used for attempting a message retry.

As shown in FIG. 4B, binding header 415 or routing binding header 418 may include a NF binding level field 425, a NF instance ID field 430, a NF failover mode field 435, a retry attempts field 440, a retry mode field 445, and a NF set ID field 450. NF binding level field 425 specifies whether messages for a session should be sent to a NF instance or to a NF set upon the occurrence of a messaging failure. NF instance ID field 430 indicates the ID and/or network address of a NF instance to which the message should be sent. If NF binding level field 425 specifies that messages should be sent to a NF instance, then NF instance ID field 430 indicates the ID and/or address of the NF instance to which the message should be sent and NF set ID field 450 may indicate an ID and/or address of a particular NF set of which the NF instance is a member. If NF binding level field 425 specifies that messages should be sent to a NF set, then NF set ID field 450 indicates the ID and/or address of the particular NF set that is being targeted, and NF instance ID field 430 indicates a NF set of which the NF instance is a member.

NF failover mode field 435 indicates whether the NF instance or the NF instances of the NF set identified in fields 430 and/or 450 are operating in active-active mode or active-standby mode. Retry attempts field 440 indicates a maximum number of retries to be performed, after an occurrence of a communication failure or error, to send a message to the target NF instance or NF set identified in fields 430 and/or 450. Retry mode field 445 indicates one of multiple different retry modes, described below, that may be used for re-sending a message. Each different retry mode may be identified with a unique ID that may be inserted into field 445. NF set ID field 450 indicates the ID of a NF set from which a NF instance may be selected as a destination for a message.

Binding header 415 or routing binding header 418 of FIG. 4B is depicted as including a certain number of fields having a certain content. However, the number, types, and content of the fields in the binding header 415 or routing binding header 418 in FIG. 4B are for illustrative purposes. Other binding headers 415 or routing binding headers 418 having a different number of, types of and/or content of, fields may be implemented. Therefore, the binding header 415 or routing binding header 418 depicted in FIG. 4B may include additional, fewer and/or different fields than those shown.

Figure 5:
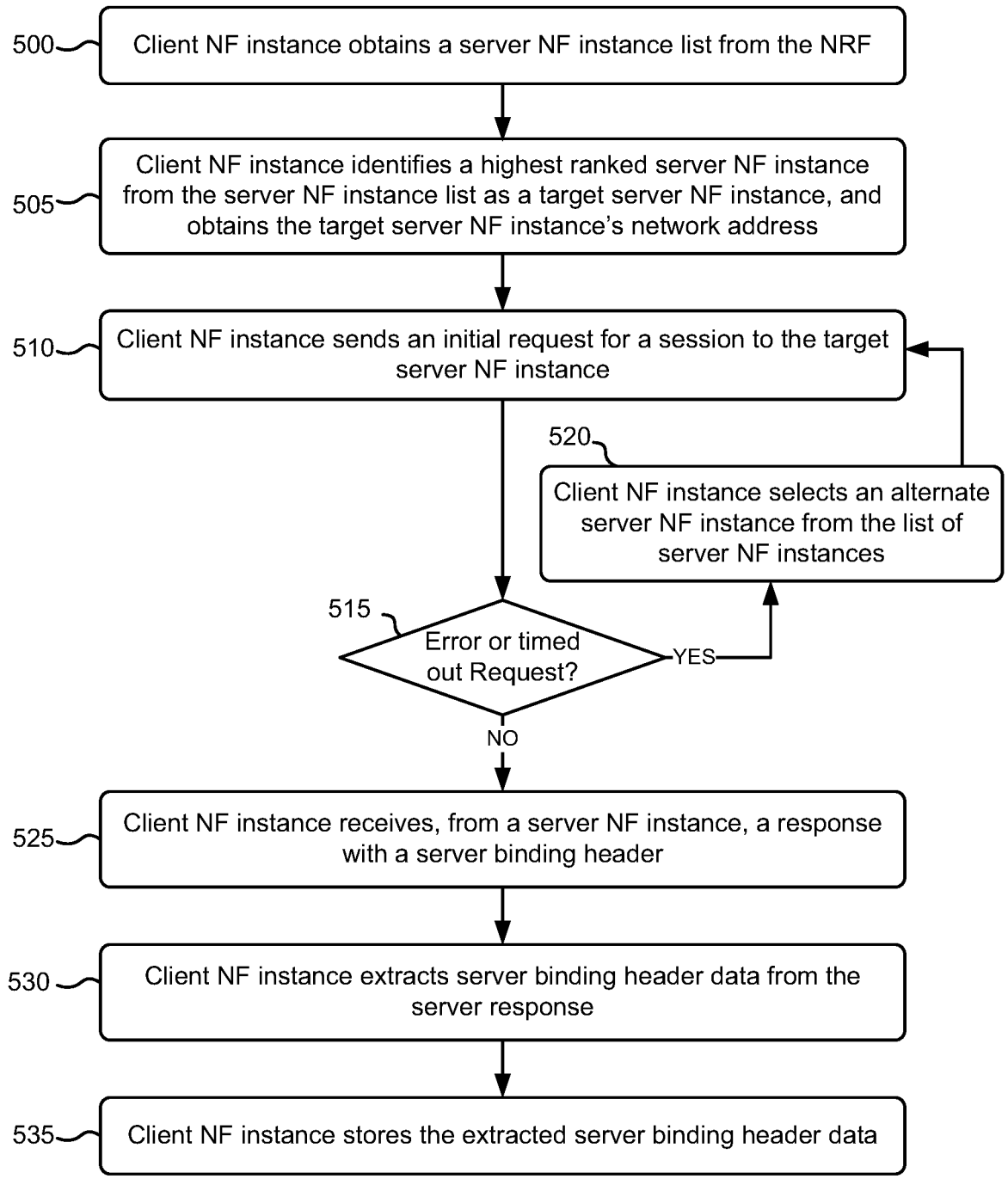
FIG. 5 illustrates an exemplary process for establishing a session between a client NF instance and a server NF instance.

FIG. 5 illustrates an exemplary process for establishing a session between a client NF instance 120 and a server NF instance 125 using messaging that includes the enhanced binding header 415 (e.g., a client binding header) of FIG. 4B. The exemplary process of FIG. 5 may be implemented by a client NF instance 120, in conjunction with one or more target server NF instances 125 and possibly one or more SCPs 130. The exemplary process of FIG. 5 may be executed when sending an initial request for a session from a client NF instance 120 to a server NF instance 125.

Figure 7:
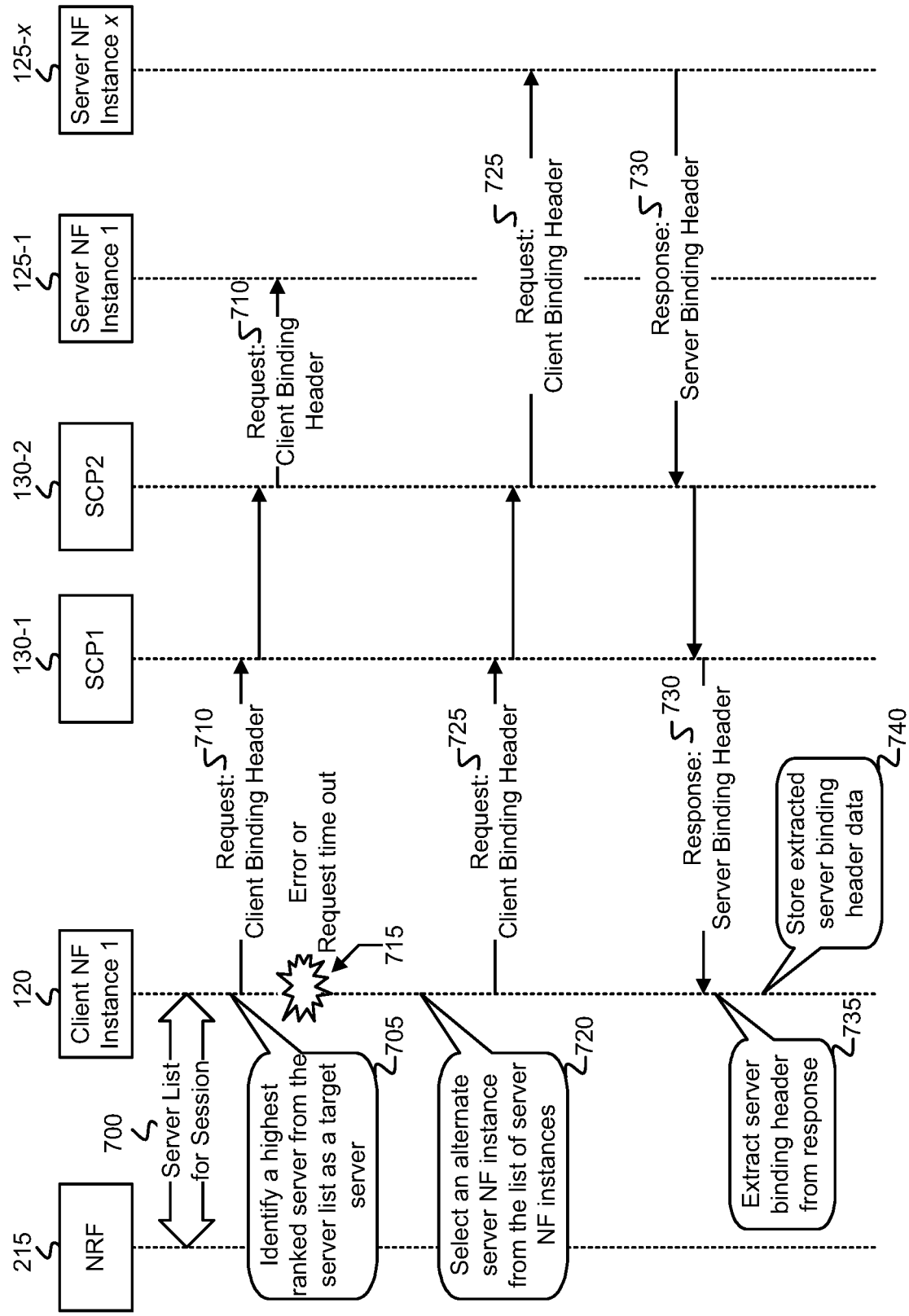
FIG. 7 depicts exemplary operations, messages, and data flows associated with an exemplary process.

The exemplary process includes a client NF instance 120 obtaining a server NF instance list from NRF 215 (block 500). NRF 215 maintains an updated repository of available server NF sets, and server NF instances, in mobile network 115, including their current status information and network address information. NRF 215 ranks the server NF sets and the server NF instances in network 115 by assigning a priority level to each NF set and/or NF instance. NF sets or NF instances currently operating in an active-active mode may be assigned higher priority levels than NF sets or NF instances currently operating in an active-standby mode. NRF 215, upon request from a client NF instance 120, may obtain a list of server NF instances, including their assigned priority levels. NRF 215 returns a message to the requesting client NF instance 120 that includes the list of server NF instances. For example, the list of server NF instances may identify server NF instances 125 in a first server NF set 110, and server NF instances 125 in a second server NF set 110 that may serve as a backup set of server NF instances. FIG. 7 depicts client NF instance 120 obtaining a server NF instance list 700 for the session.

The client NF instance 120 identifies a highest ranked server NF instance from the server NF instance list as a target server NF instance, and obtains the target server NF instance's network address (block 505). The client NF instance 120 analyzes the priority levels of the server NF instances 125 contained in the server NF instance list received from NRF 215, and identifies the server NF instance 125 having a highest priority level. The client NF instance 120 retrieves the network address of the server NF instance 125 having the highest priority level from the server NF instance list. FIG. 7 shows client NF instance 120 identifying 705 a highest ranked server from the server NF instance list as a target NF server instance.

The client NF instance 120 sends an initial request for a session to the target server NF instance (block 510) and determines if, subsequent to sending the initial session request, an error, or a timed out request, has occurred (block 515). The initial request may be sent with a message 400 having data in the message destination header 405 that indicates the ID or network address of the target server NF instance 125 and data in the proxy destination header 410 that indicates the ID or network address of an intermediate SCP 130. The message 400 may further include a binding header 415 and a message payload 420 that indicates that the message 400 is attempting to establish a session from the client NF instance 120 and a server NF instance 125. An error message may be returned to the client NF instance 120 under certain conditions, or a timed out period may expire subsequent to sending the session request to the target server NF instance. The timed out period may include a length of time, from sending the request, during which a response to the request should be expected to be received. If a response from a server NF instance is not received before expiration of the timed out period, then the client NF instance 125 may consider the communication to have failed. FIG. 7 depicts client NF instance 120 sending a request 710, that includes a client binding header, to server NF instance 125 via SCPs 130. SCPs 130 route the request 710 received from client NF instance 120 to the target server NF instance 125 across network 115.

If an error or timed out request has occurred (YES—block 515), then the client NF instance 120 selects an alternate server NF instance from the list of server NF instances (block 520), and the exemplary process returns to block 510, with the client NF instance 120 sending another initial request for the session to the alternate server NF instance. For example, the list of server NF instances may include server NF instances that are members of a first server NF set and other server NF instances that are members of a second server NF set. If an error or timed out request has occurred, then the client NF instance 120 may select the alternate server NF instance from a different server NF set. For example, if a request to a first server NF instance, which is a member of a first server NF set, results in an error or is timed out, then the client NF instance 120 may select a second server NF instance from a second server NF set. In circumstances where the list of server NF instances only includes server NF instances from a same server NF set, then the client NF instance 120 may select an alternate server NF instance from the group of server NF instances within the same server NF set. FIG. 7 shows a circumstance where an error or timed out request occurs 715 subsequent to client NF instance 120 sending the request 710 to the target server NF instance 125. In this circumstance, the client NF instance 120 selects 720 an alternate server NF instance (server NF instance 125-*x*) from the list of server NF instances, and sends another initial request 725, with a client binding header, to the alternate server NF instance 125-*x*.

The client NF instance 120 receives, from the server NF instance 125, a response with a server binding header (block 525), extracts server binding header data from the server response (block 530), and stores the extracted server binding header data (block 535). For example, the client NF instance 120 extracts the NF binding level from field 425, the NF instance ID from field 430, the NF failover mode from field 435, the number of retries from field 440, the retry mode from field 445, and a NF set ID from field 450. Client NF instances 120 stores the extracted binding header data, in association with an identifier for the session, within memory for retrieval and use when sending a next message to a server NF instance for the session. FIG. 7 shows server NF instance 125-x returning a response 730, with a server binding header, to the requesting client NF instance 120 via SCPs 130. Upon receipt of the response 730, client NF instance 120 extracts 735 the server binding header from the response 730, and stores 740 the extracted server binding header data in memory.

Figure 6A:
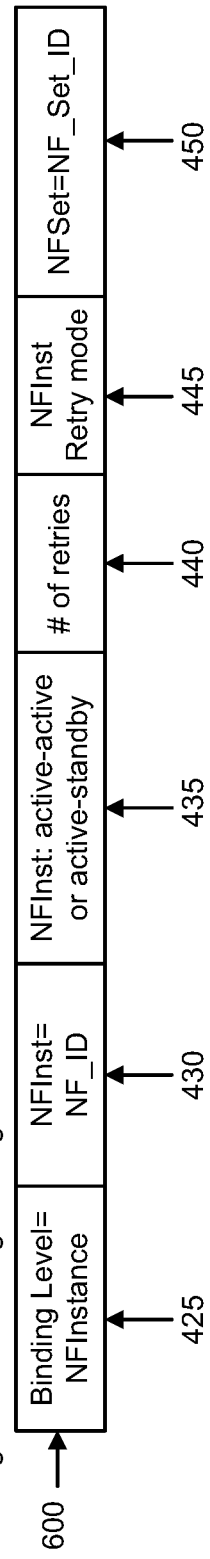
FIGS. 6A and 6B depict examples of a binding header for a NF instance binding level and a NF set binding level.
Figure 6B:
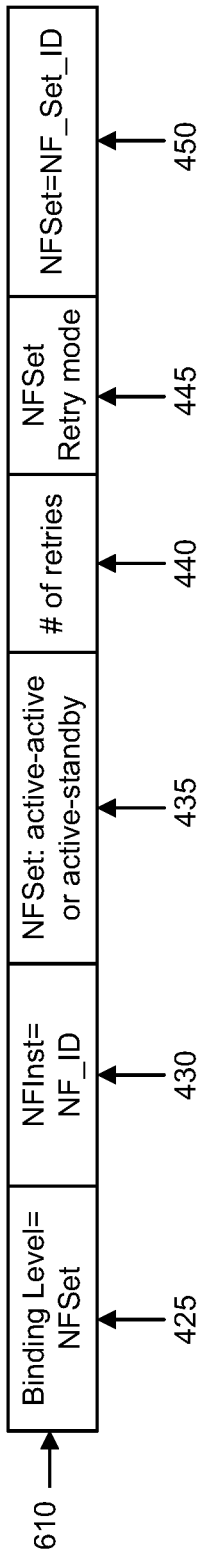

FIGS. 6A and 6B depict specific examples of the binding header 415 or routing binding header 418 of FIG. 4B, such as received in the server response by the client NF instance 120 in block 525, for two different binding levels: a NF instance binding level and a NF set binding level. The binding header/routing binding header 600 of FIG. 6A depicts an example of a NF instance binding level, i.e., when the binding level in field 425 of header 600 is set to "NF instance." In this example, field 430 includes the ID (e.g., network address) for a NF instance that is to be a target for a message. The NF instance binding level instructs the receiving NF instance (e.g., a client NF instance 120) to send messages for the session to a NF instance (e.g., a server NF instance 125) further identified in the binding header/routing binding header 600. Furthermore, in this example, field 435 identifies the NF failover mode for the NF instance, field 440 specifies the maximum number of retries that are to be attempted for subsequent messages when messaging errors occur or messages are timed out; field 445 identifies the retry mode, of multiple retry modes, to be used when attempting retries responsive to errors or timed out messages; and field 450 identifies the NF set ID of the NF set of which the NF instance identified in field 430 is a member.

The binding header/routing binding header 610 of FIG. 6B depicts an example of a NF set binding level, i.e., when the binding level in field 425 of header 610 is set to "NF set." In this example, field 430 includes the ID (e.g., network address) for a NF instance that is to be a target for the message. The NF set binding level specified in field 425 instructs the receiving NF instance to send subsequent messages for the session to a NF instance, of the multiple NF instances, that is a member of the NF set identified in field 450. Further, in this example, field 435 identifies the NF failover mode for the NF instances that are members of the NF set identified in field 430; field 440 specifies the maximum number of retries that are to be attempted for messages when messaging errors occur or messages are timed out; and field 445 identifies the retry mode, of multiple retry modes, to be used when attempting retries responsive to errors or timed out messages. Since the binding level in field 425 is set to "NF set," the NF instance field 430 may be omitted from binding header 610

Figure 8:
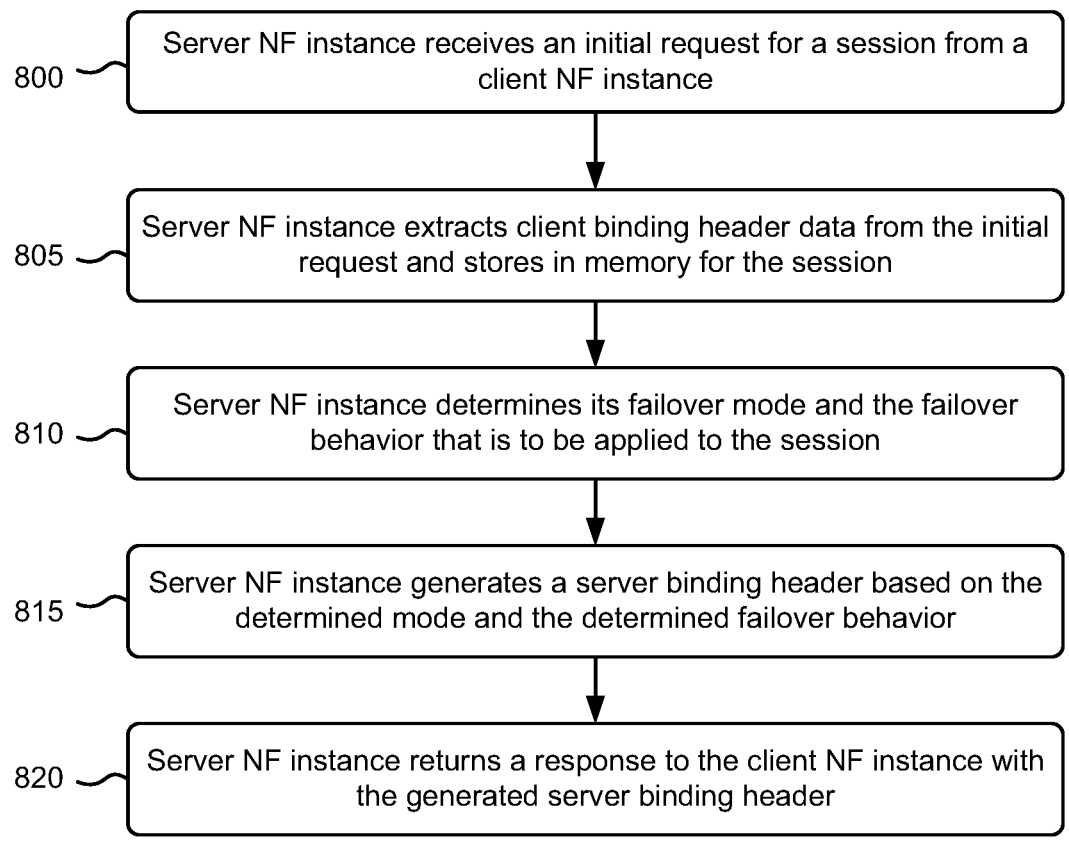
FIG. 8 illustrates an exemplary process for a server NF instance to provide a client NF instance instructions, including messaging failure instructions, regarding communicating with the server NF instance during a session.

FIG. 8 illustrates an exemplary process for a server NF instance 125 to provide a client NF instance 120 instructions regarding communicating with the server NF instance 125 during a session, including failover messaging instructions, using the enhanced binding header 415 of FIG. 4B. The exemplary process of FIG. 8 may be implemented by a server NF instance 125, in conjunction with one or more SCPs 130 and one or more client NF instances 120. The exemplary process of FIG. 8 may be executed when a server NF instance 125 receives an initial request for a session from a client NF instance 120 (e.g., sent from the client NF instance 120 in block 510 of FIG. 5).

Figure 9:
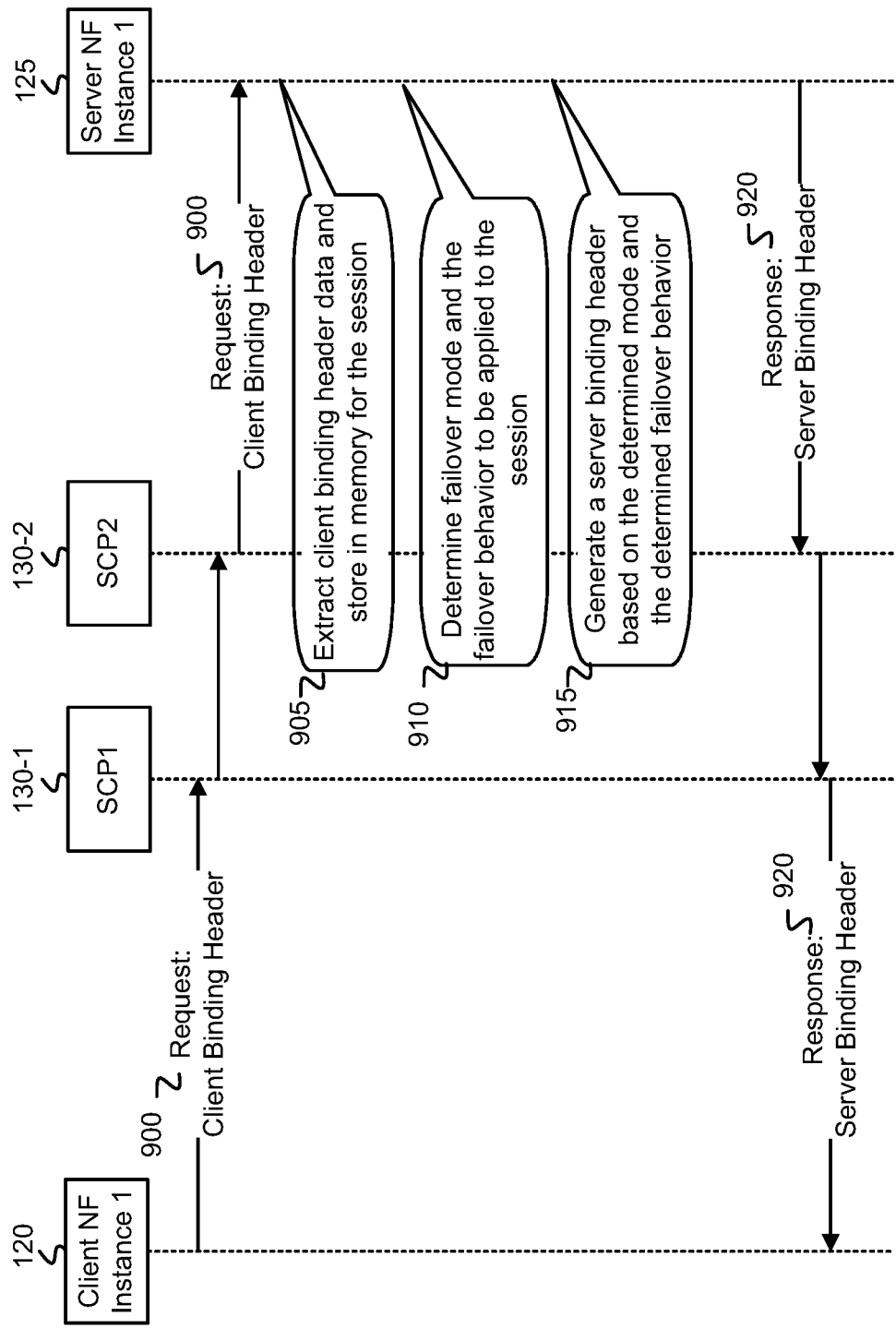
FIG. 9 depicts exemplary operations, messages, and data flows associated with an exemplary process.

The exemplary process includes a server NF instance 125 receiving an initial request for a session from a client NF instance 120 (block 800). Server NF instance 125 may receive the initial request sent by the client NF instance 120 in block 510 of FIG. 5. The initial request may include a message 400 having a client binding header 415 such as described with respect to FIG. 4B and FIGS. 6A and 6B above. The client binding header 415 contained in the initial request message from the client NF instance 120 includes fields 425-450 having content that instructs the server NF instance 125 regarding how it should send new requests or commands for this session to the client NF instance 120. FIG. 9 depicts server NF instance 125 receiving a request 900, with a client binding header, from client NF instance 120 via SCPs 130.

The server NF instance 125 extracts client binding header data from the initial request and stores the client binding header data in memory for the session (block 805). The server NF instance 125 extracts data from fields 425, 430, 435, 440, 445, and 450 of the client binding header 415. In the initial request from the client NF instance 120, the NF instance ID field 430 identifies the NF instance ID or network address of the client NF instance 120 to which the server NF instance 125 should send subsequent requests or commands for the session. NF set ID field 450 identifies the NF set ID or network address of the NF set of which the client NF instance, identified in field 430, is a member. The NF failover mode 435 identifies whether the client NF instance 120 or client NF set 105 identified in fields 430 or 450 operate in an active-active mode or an active-standby mode. FIG. 9 shows server NF instance 125 extracting 905 the client binding header data from request 900 and storing the binding header data in memory.

The server NF instance 125 determines its failover mode and the failover behavior that is to be applied to the session (block 810). The server NF instance 125 maintains knowledge of its current failover mode (e.g., active-active, active-standby), and also stores data specifying the failover behavior to be applied to the session in the event of messaging failure. The failover behavior may include the retry mode, and the maximum number of retries, to be applied to messages sent from a client NF instance 120 to the server NF instance 125 for the session. The failover behavior to be applied to the session by the other end of the session (e.g., a client NF instance 120) may additionally include the NF binding level (e.g., NF instance or NF set), the server NF instance ID, and/or the server NF set ID. FIG. 9 shows server NF instance 125 determining 910 its failover mode and the failover behavior to be applied to the session.

The server NF instance 125 generates a server binding header based on the determined failover mode and the determined failover behavior (block 815). The server NF instance 125 inserts data identifying its failover mode into field 435, the maximum number of retries into field 440, and data identifying the retry mode into field 445 of a binding header 415. The server NF instance 125 further inserts data identifying the binding level (e.g., server NF instance or server NF set) into field 425, the server NF instance 125's ID into field 430, and/or the server NF set's server NF set ID into field 450. FIG. 9 shows server NF instance 125 generating 915 a server binding header based on the determined failover mode and the determined failover behavior.

The server NF instance 125 returns a response to the client NF instance 120 with the generated server binding header (block 820). The server NF instance 125 inserts the server binding header 415 generated in block 815 into the outgoing response message 400 and sends the response to a SCP 130 for routing to a client NF instance 120. The outgoing message 400 further includes a message destination header 405 that includes data indicating an ID or network address of the client NF instance 120, a proxy destination header 410 that includes data indicating an ID or network address of the intermediate SCP 130, and a message payload 420 that includes data indicating that the message 400 is a response message. FIG. 9 depicts server NF instance 125 returning a response 920, that includes the previously generated 915 server binding header, to the requesting client NF instance 120 via SCPs 130.

Figure 10A:
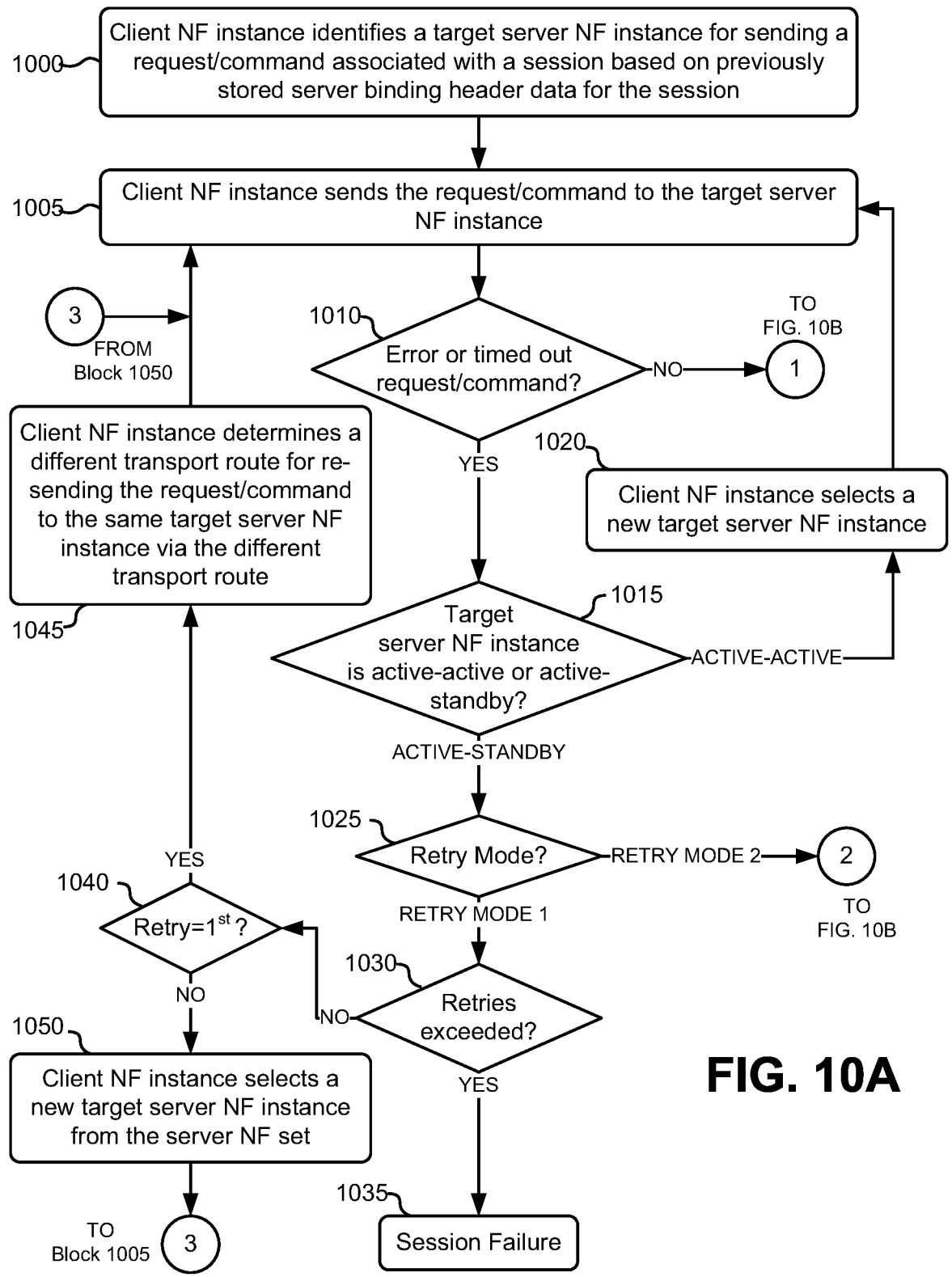
FIGS. 10A and 10B illustrate an exemplary process for sending a request or command associated with a previously established session from a client NF instance to a server NF instance.
Figure 10B:
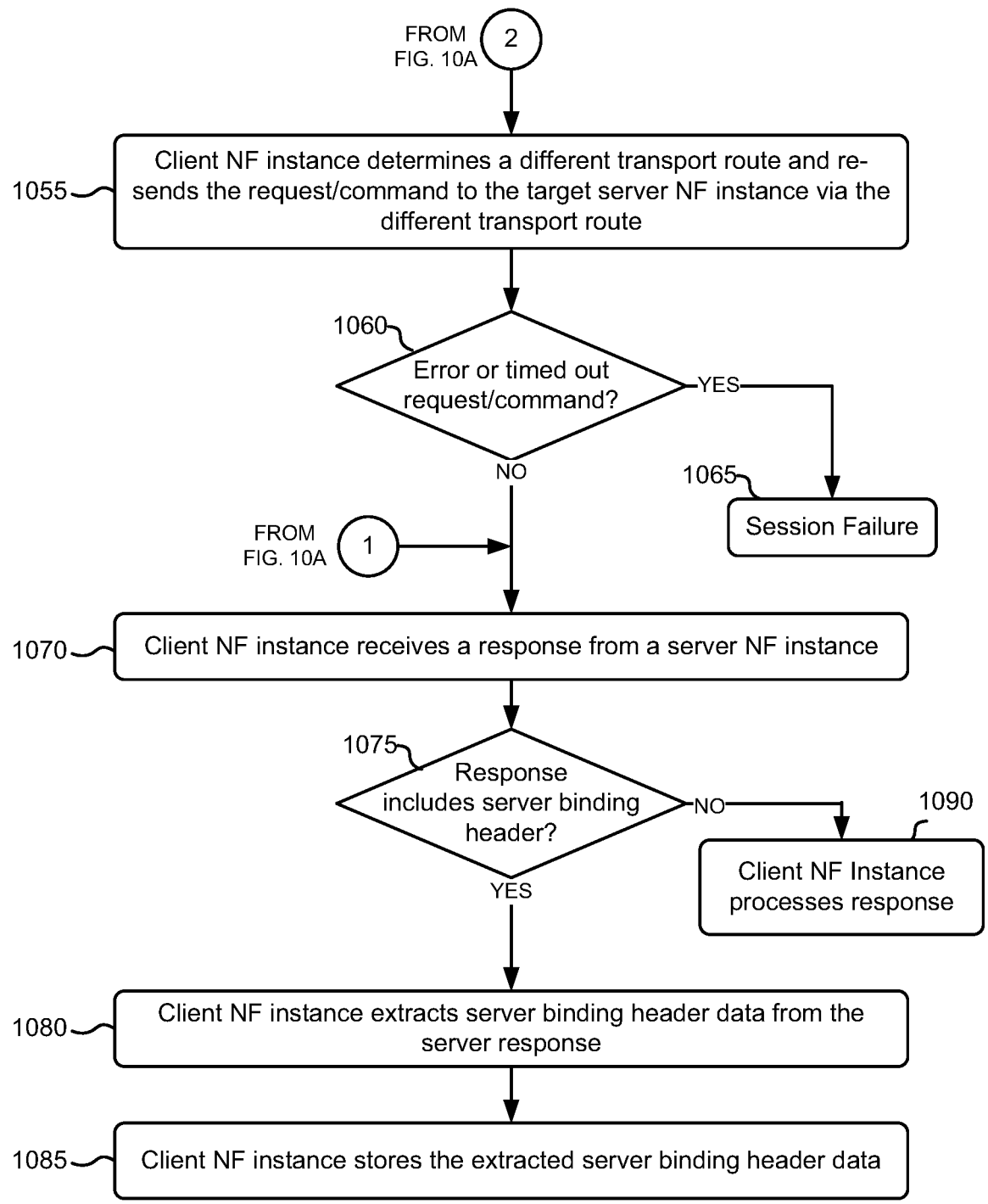

FIGS. 10A and 10B illustrate an exemplary process for sending a request or command associated with a previously established session from a client NF instance 120 to a server NF instance 125. The exemplary process of FIGS. 10A and 10B may be implemented by a client NF instance 120 in conjunction with one or more SCPs 130 and one or more server NF instances 125. The exemplary process of FIGS. 10A and 10B may be executed when sending subsequent requests/commands for a session to a server NF instance 125 after establishment of the session (e.g., subsequent to execution of the exemplary process of FIG. 5 above).

Figure 11A:
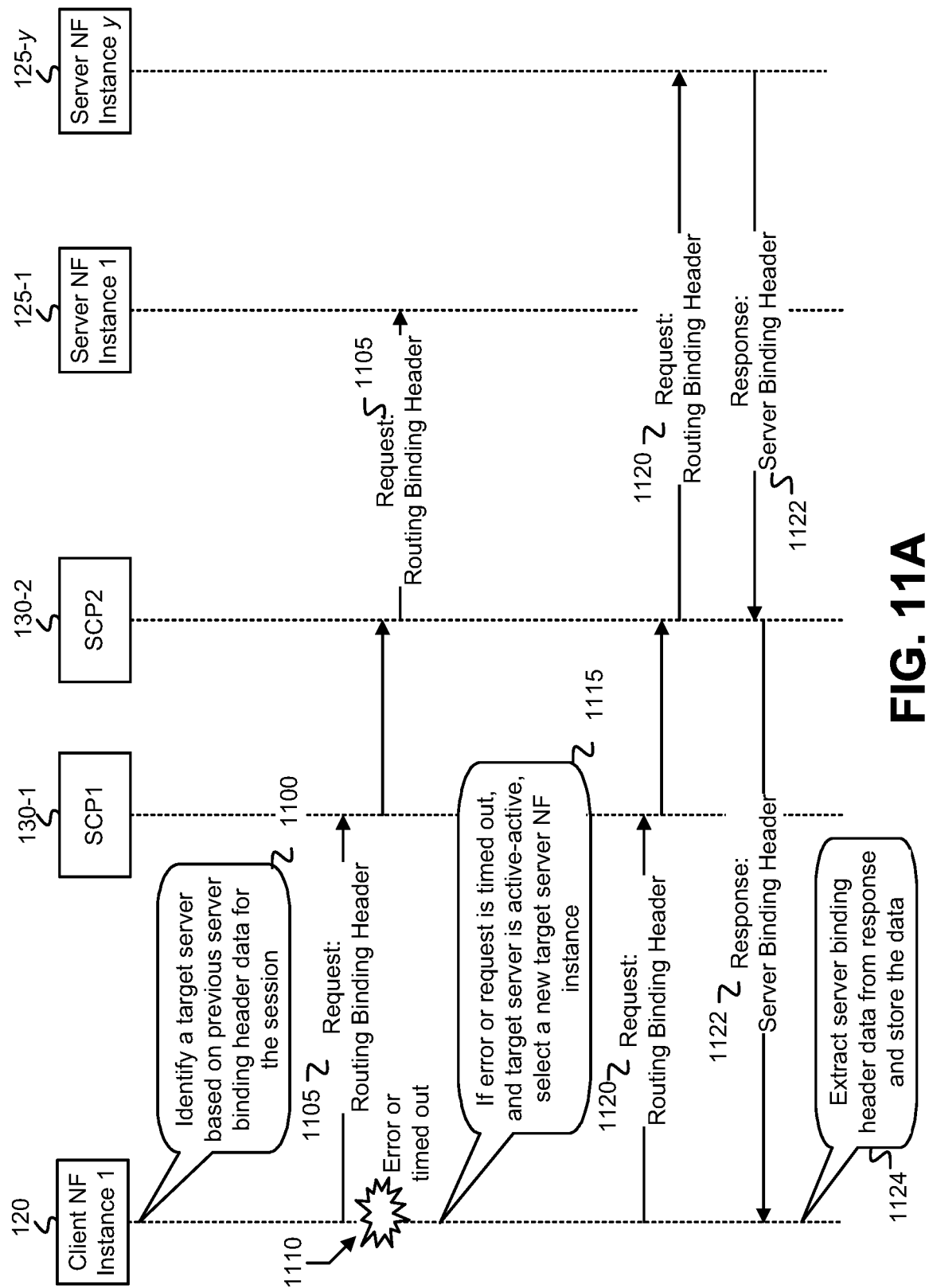
FIGS. 11A-11C depict exemplary operations, messages, and data flows associated with an exemplary process.

The exemplary process includes a client NF instance 120 identifying a target server NF instance 125 for sending a request/command associated with a session based on previously stored server binding header data for the session (block 1000). The client NF instance 120 retrieves previously stored binding header data (e.g., stored in block 535 of FIG. 5) that corresponds to field 425, field 430, and possibly field 450 of a binding header 415 received in a response from a server NF instance 125. If the binding level identified in field 425 is "NF instance," then client NF instance 120 identifies the server NF instance of NF target field 430 as the target for the request/command. If the binding level identified in field 425 is "NF set," then client NF instance 120 identifies the NF set from NF set ID field 450 as including a server NF to be selected as a target. FIG. 11A depicts client NF instance 120 identifying 1100 a target server based on previous server binding header data for the session.

The client NF instance 120 sends the request/command to the target server NF instance 125 (block 1005). The client NF instance 120 sends the request/command towards the target server NF via the SCP(s) 130 within network 115 that routes the request/command to the target server NF or target server NF set. FIG. 11A shows client NF instance 120 sending a request message 1105, along with a routing binding header, to the target server NF instance 125-1 via SCPs 130. The routing binding header includes the binding header data received from the server NF instance 125 in block 525 of FIG. 5. The routing binding header included in the request message 1105 is intended to instruct the intermediate SCP(s) 130 in the transport route between the client NF instance 120 and the server NF instance 125 of where and how to send a message if there is a communication error or timed out message, including a particular retry mode of multiple retry modes to be used, a number of retry attempts to be made, and the server NF instance or set of server NF instances to which a message should be redirected.

The client NF instance 120 determines if an error, or a timed out request/command, has occurred (block 1010). An error message may be returned to the client NF instance 120 under certain conditions, or a timed out period may expire subsequent to sending the request/command to the target server NF instance. The timed out period may include a length of time, from sending the request/command, during which a response to the request is expected to be received. If a response from a server NF instance is not received before expiration of the timed out period, then the client NF instance 125 may consider the communication to have failed. If an error, or timed out request/command, has not occurred (NO—block 1010), then the exemplary process continues at block 1070 (FIG. 10B) below with the receipt of a response by the client NF instance 120 from a server NF instance 125.

If an error, or timed out request/command, has occurred (YES—block 1010), then the client NF instance 120 determines if the target server NF instance 125 is operating in active-active or active-standby mode (block 1015). The client NF instance 120 may obtain the failover mode data from field 435 of a binding header 415 of a response received by the client NF instance 120 from the target server NF instance 125 in block 525 of FIG. 5, and determine if the failover mode data identifies the target server NF instance 125 as either operating in active-active mode or active-standby mode.

If the target server NF instance 125 is operating in active-active mode (ACTIVE-ACTIVE—block 1015), then the client NF instance 120 selects a new target server NF instance 125 based on the previously stored server binding header data for the session (block 1020) and returns to block 1005 with the client NF instance 120 sending another request/command to the new target server instance 125. The client NF instance may obtain the NF set ID from field 450 of a binding header 415 of a response received by the client NF instance 120 in block 525 of FIG. 5, and may select a new target server NF instance from the server NF instances within the identified server NF set. Alternatively, the client NF instance 120 may obtain a server NF instance list from the NRF 215, such as the list obtained in block 500 of FIG. 5, and may identify a next highest ranked server NF instance, as the target server NF instance, from the server NF instance list. FIG. 11A depicts an error or timed out communication 1110 occurring subsequent to client NF instance 120 sending the request 1105 to the target server NF instance 125-1. As further shown, based on the occurrence of the error or timed out communication 1110 and the target server NF instance 125-1 operating in active-active failover mode, client NF instance 120 selects 1115 a new target server NF instance for the session. Client NF instance 120 sends a request 1120, which includes a routing binding header, to the new target server NF instance 125-y via SCPs 130.

If the target server NF instance 125 is in active-standby mode (ACTIVE-STANDBY—block 1015), then the client NF instance 120 determines the retry mode for the session (block 1025). The client NF instance may obtain the retry mode data from field 445 of a binding header 415 of a response received by the client NF instance 120 from the server NF instance 125 in block 525 of FIG. 5. One of multiple different retry modes may be identified from field 445. In one implementation, two different retry modes may be supported—retry mode 1 and retry mode 2. Retry mode 1 may involve the client NF instance 120 re-sending the request/command to the same server NF instance 125 for a first retry, and selecting a new target server NF instance 125 for sending the request/command for subsequent retries if the executed number of retries has not exceeded the number from field 440 of the binding header 415 previously received in the response from the server NF instance 125 in block 525 of FIG. 5. Retry mode 2 may involve the client NF instance 120 re-sending the request/command via a different transport route to the target server NF instance 125. The different transport route may include a different route from the client NF instance 120 to the target server NF instance 125 that includes a different SCP(s) 130. Therefore, the different transport route includes a different SCP 130 that routes the message from the client NF instance 120 to the server NF instance 125. In other implementations, different retry modes, other than the "retry mode 1" and the "retry mode 2" described above, may be used. Furthermore, more than two retry modes may be supported (e.g., three or four retry modes instead of two retry modes). For example, there may be a "retry mode 3" which involves the client NF instance 120 re-sending the request/command directly to the target server NF instance 125 and bypassing the SCP 130 to eliminate potential SCP issues on the transport path between the client NF instance 120 and the target server NF instance 125.

If the retry mode is retry mode 1 (RETRY MODE 1—block 1025), then client NF instance 120 determines if the maximum number of retries for this request/command for this session has been exceeded (block 1030). Client NF instance 120 compares the current number of retries for the request/command with the maximum number of retries from field 440 of binding header 415 of the response from the server NF instance 125 received in block 525 of FIG. 5 to determine if the current number of retries exceeds the maximum number of retries from field 440.

Figure 11B:
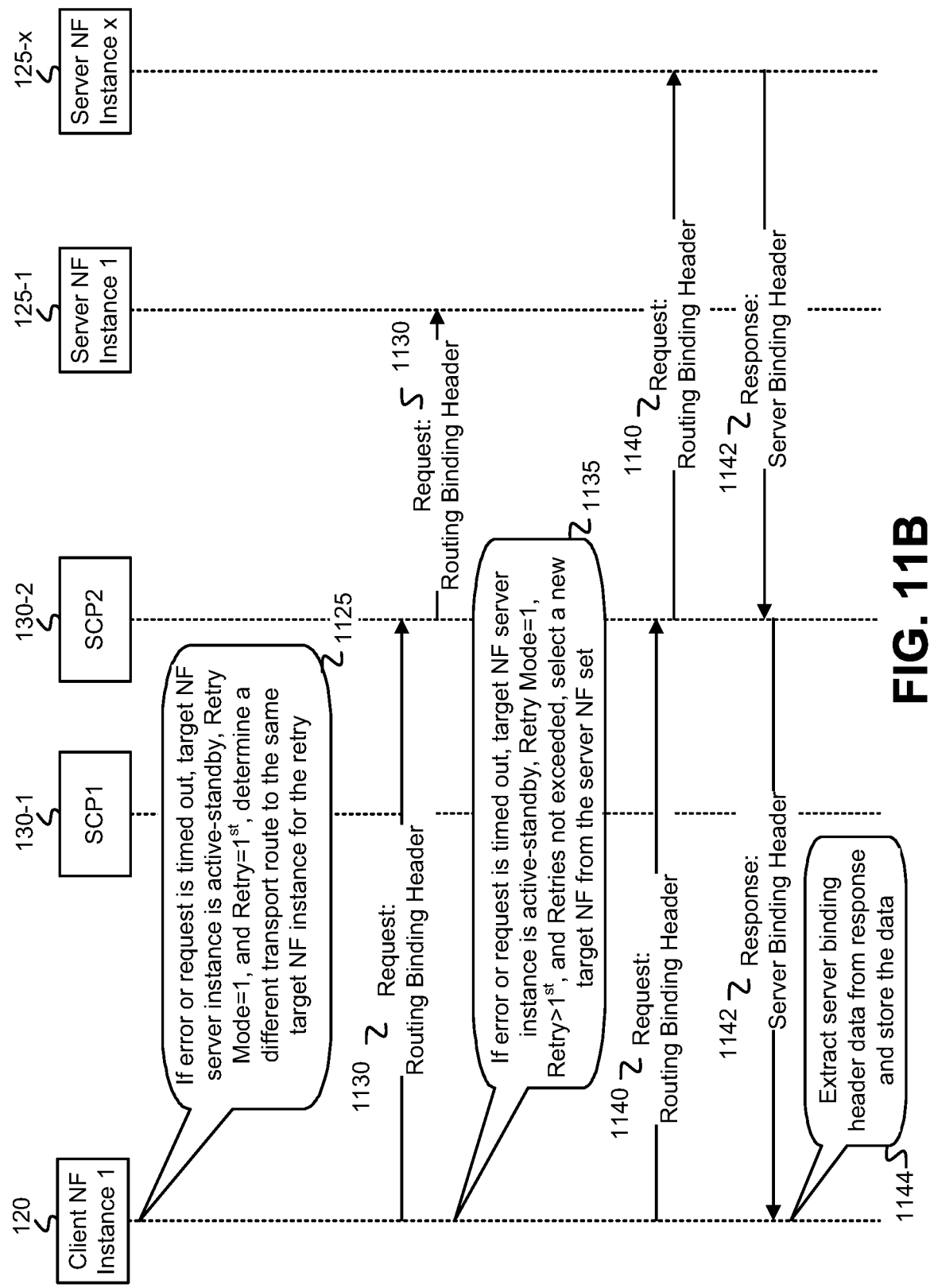

If the number of retries for this session has not been exceeded (NO—block 1030), then the client NF instance 120 determines if the retry attempt will be the first retry (block 1040). If the retry is the first retry (YES—block 1040), then the client NF instance 120 determines a different transport route for re-sending the request/command to the same target server NF instance via the different transport route for the first retry (block 1045). The different transport route may include a different SCP(s) 130 on a network path between the client NF instance 120 and the same target server NF instance 125. The client NF instance 120, therefore, determines a different SCP(s) 130 to act as the proxy for routing the retry message to the target server NF instance 125. After determining the different SCP(s) 130 for the alternate transport route, the exemplary process returns to block 1005 and the client NF instance 120 performs another attempt to send the request/command message to the target server NF instance 125 via the different transport route. The request/command message may include data that indicates the ID or network address of the alternate SCP 130 associated with the different transport route in the proxy destination header 405 of the message. FIG. 11B shows client NF instance 120, based on the occurrence of the error or timed out communication 1110, the target NF server instance 125 operating in active-standby failover mode, the retry mode equaling retry mode 1, and the retry being the $1^{st}$ retry, determining 1125 a different transport route to the same target NF instance 125-1 for the retry attempt. FIG. 11B further shows client NF instance 120 sending another request 1130, that includes a routing binding header, to the same target NF instance 125-1 for the $1^{st}$ retry via a different transport route that includes SCP2 130-2.

Returning to block 1030, if the number of retries for this session has been exceeded (YES—block 1030), then a session failure 1035 has occurred. In some implementations, the client NF instance 120 may attempt to establish another session using the exemplary process of FIG. 5.

If the number of retries has not been exceeded (NO—block 1030) and the retry attempt is not the first retry (i.e., a second retry, or subsequent retry not exceeding the maximum number of retries) (NO—block 1040), then the client NF instance 120 selects a new target server NF instance 125 from the server NF set (block 1050). The client NF instance 120 identifies the server NF set from field 450 of the binding header 415 of the response received from the server NF instance 125 in block 525 of FIG. 5, and obtains a list of server NF instances that are members of the identified server NF set. The client NF instance 125 selects one of the server NF instances from the list of server NF instances as the new target server NF instance 125, and returns to block 1005 with client NF instance 120 sending the request/command to the new target server NF instance selected from the server NF set. FIG. 11B shows the client NF instance 120. based on the occurrence of the error or timed out communication 1110, the target NF server instance 125 operating in active-standby failover mode, the retry mode equaling 1, the retry being greater than the $1^{st}$ retry, and the retries not exceeding the maximum number of retries, selecting 1135 a new target NF instance 125-x from the server NF set for the retry. FIG. 11B further shows client NF instance 120 sending another request 1140, that includes a routing binding header, to the new target NF instance 125-x for the retry.

Figure 11C:
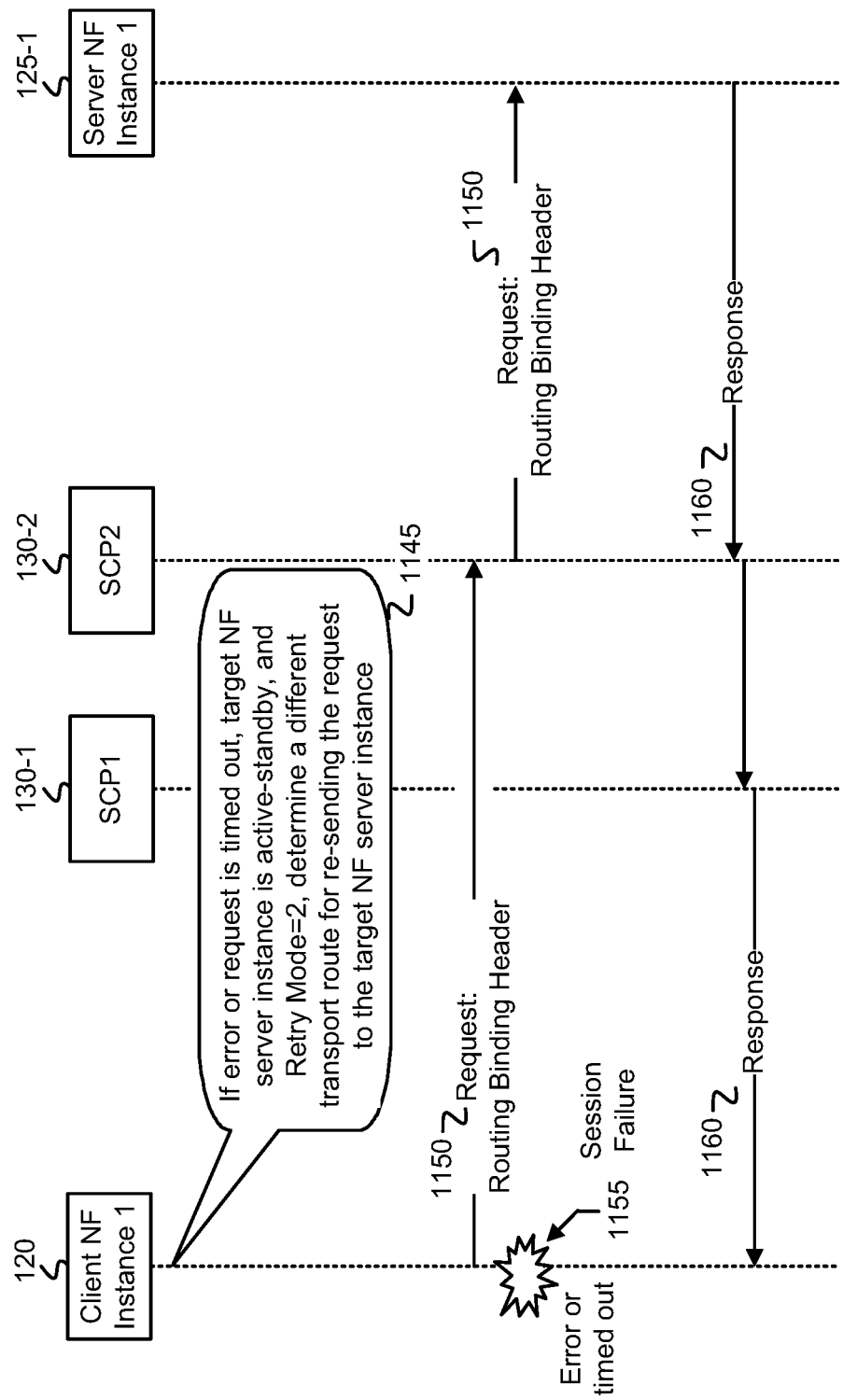

Returning to block 1025, if the retry mode is retry mode 2 (RETRY MODE 2—block 1025), then client NF instance 120 determines a different transport route to the target server NF instance 125 and re-sends the request/command to the target server NF instance 125 via the different transport route (block 1055) (FIG. 10B). FIG. 11C shows the client NF instance 120, based on: 1) the occurrence of the error or timed out communication 1110, 2) the target NF server instance 125 operating in active-standby failover mode, and 3) the retry mode equaling retry mode 2, determining 1145 a different transport route for re-sending the request to the target NF instance 125-1. FIG. 11C further shows client NF instance 120 sending another request 1150, that includes a client binding header, to the same target NF instance 125-1 via a different transport route that includes SCP2 130-2, but not SCP 130-1.

The client NF instance 120 determines if an error, or a timed out request/command, has occurred (block 1060). As described with respect to block 1010 above, an error message may be returned to the client NF instance 120 under certain conditions, or a timed out period may expire subsequent to sending the request/command to the target server NF instance. If an error, or timed out request/command, has occurred (YES—block 1060), then a session failure 1065 may have occurred. In some implementations, the client NF instance 120 may attempt to establish another session using the exemplary process of FIG. 5. FIG. 11C depicts an error or timed out communication occurring 1155, subsequent to client NF instance 120 sending the request 1150 to server NF instance 125-1 via the different transport route, resulting in a session failure.

If an error, or timed out request/command, has not occurred (NO—block 1060), then the client NF instance 120 may receive a response from a server NF instance 125 (block 1070). If the response includes a server binding header (YES—block 1075), then the client NF instance 120 extracts the server binding header data from the server response (block 1080), and stores the extracted server binding header data in memory (block 1085). For example, the client NF instance 120 extracts, from the binding header 415 of the response received from the server NF instance 125, the NF binding level from field 425, the NF instance ID from field 430, the NF failover mode from field 435, the number of retries from field 440, the retry mode from field 445, and a NF set ID from field 450. The response may include a server binding header, for example, subsequent to execution of blocks 1020 or 1050 where the client NF instance 120 has selected a new target server NF instance 125 and sent a request/command to a new target server NF instance 125 in block 1005. The response may not include a server binding header, for example, subsequent to execution of block 1055 where the client NF instance 120 has resent the request/command to the same target server NF instance 125, but via a different transport route. Client NF instance 120 stores the extracted binding header data, in association with an identifier for the session, within memory for retrieval and use when sending a next message to a server NF instance for the session. The client NF instance 120 may replace the previous binding header data, stored in block 535 of FIG. 5, with the server binding header data extracted from the response message in block 1080.

Referring back to FIG. 11A, subsequent to the client NF instance 120 sending a Request message 1120 to a newly selected target server NF instance 125-*y*, the client NF instance 120 receives a Response message 1122 from the new target server NF instance 125-*y* that includes a server binding header. Client NF instance 120 extracts 1124 the server binding header data from the Response 1122 and stores the data. Referring also back to FIG. 11B, subsequent to the client NF instance 120 sending a Request message 1140 to a newly selected target server NF instance 125-*x*, the client NF instance 120 receives a Response message 1122 from the new target server NF instance 125-*x* that includes a server binding header. Client NF instance 120 extracts 1144 the server binding header data from the Response 1142 and stores the data.

If the response does not include a server binding header (NO—block 1075), then the client NF instance 120 may process the response (block 1090), including any message payload 420, in accordance with normal procedures. FIG. 11C shows client NF instance 120 receiving a response 1160, that does not include a server binding header, from the target server NF instance 125-1 via SCPs 130 for subsequent processing (not shown).

Returning to block 1010, if an error or time out request has not occurred (NO—block 1010) subsequent to client NF instance 120 sending the request/command in block 1005, then client NF instance 120 may receive a response from a server NF instance 125 (block 1070). If the response is from an alternate server NF instance 125, such as an alternate target server NF instance 125 selected in block 1020 or 1050, then the response may include a new server binding header such as that received at the client NF instance 120 from the original server NF instance 125 in block 525 of FIG. 5. However, if the response is from the original server NF instance 125, which already returned a response with a server binding header in block 525 of FIG. 5, then a server binding header may or may not be included in the response message. In some circumstances, the original server NF instance 125 may include a new server binding header if the original server NF instance 125 provides an updated server binding header. If the response includes a server binding header (YES—block 1075), then the client NF instance 120 extracts the server binding header data from the server response (block 1080), and stores the extracted server binding header data in memory (block 1085). Client NF instance 120 stores the extracted binding header data, in association with an identifier for the session, within memory for retrieval and use when sending a next message to a server NF instance for the session. The client NF instance 120 may replace the previous binding header data, stored in block 535 of FIG. 5, with the server binding header data extracted from the response message in block 1080. If the response does not include a server binding header (NO—block 1075), then the client NF instance 120 may process the response (block 1090), including any message payload 420, in accordance with normal procedures.

The exemplary process of FIGS. 10A and 10B described above involves a client NF instance 120 sending a request or command associated with a previously established session to a server NF instance 125. Additionally, the process of FIGS. 10A and 10B may be used for a server NF instance 125 to send a request or command associated with a previously established session to a client NF instance 120. To implement this embodiment, each occurrence of the word "client" in the blocks of FIGS. 10A and 10B should be replaced with "server" and each occurrence of the word "server" should be replaced with "client." As examples of this alternative, block 1000 would state "server NF instance identifies a target client NF instance for sending a request/command associated with a session based on previously stored client binding header data for the session," and block 1050 would state "server NF instance selects a new target client NF instance from the client NF set." Similar changes would be made in diagrams 11A-11C, with the addition of the "client NF instance 120" on the left becoming "server NF instance 125," "server NF instance 1 125-1" on the right becoming "client NF instance 1 125-1," and "server NF instance y 125-*y*" on the right becoming "client NF instance y 125-*y*." A server NF instance 125 would, thus, use the same process for retry in the event of a timeout or an error as described for a client NF instance 120 in FIGS. 10A and 10B.

Figure 12:
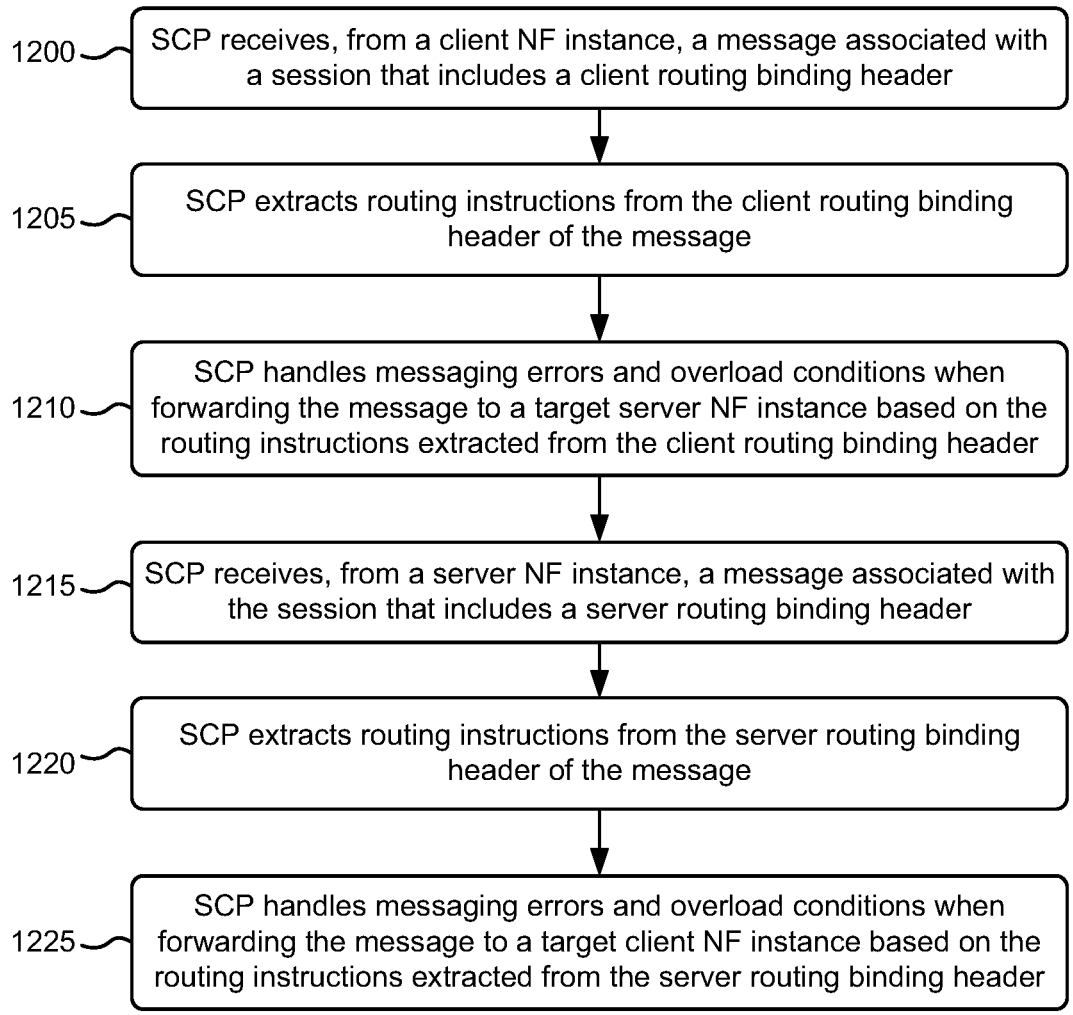
FIG. 12 illustrates an exemplary process for providing instructions regarding the routing of messages for a session, between a client NF instance and a server NF instance via a Service Communication Proxy.

FIG. 12 illustrates an exemplary process for providing instructions regarding the routing of messages for a session, between a client NF instance 120 and a server NF instance 125 via a SCP 130, using the enhanced routing binding header 418 of FIG. 4B. The exemplary process of FIG. 12 may be implemented by a SCP 130 in conjunction with a client NF instance 120 and/or a server NF instance 125. The exemplary process of FIG. 12 may be executed when one or more messages, that include routing binding headers and are associated with a session between a client NF instance 120 and a server NF instance 125, are received by a SCP 130 in network 115. In implementations in which a single SCP 130 acts as a routing node between a client NF instance 120 and a server NF instance 125, the SCP 130 may perform blocks 1200-1225 of FIG. 12. In implementations in which a first SCP 130 acts as a routing node for a client NF instance 120 and a second SCP 130 acts as a routing node for a server NF instance 125, the first SCP 130 may perform blocks 1200, 1205, and 1210, while the second SCP 130 may perform blocks 1215, 1220, and 1225 of FIG. 12.

The exemplary process includes a SCP 130 receiving, from a client NF instance 120, a message associated with a session that includes a client routing binding header (block 1200) and extracting routing instructions from the client routing binding header of the message (block 1205). The SCP 130 receives a message 400 that includes a message destination header 410 and a routing binding header 418. The SCP 130 may extract the ID or network address of the destination server NF instance 125 from message destination header 410 and the binding level, NF target, NF failover mode, number of retries, retry mode, and NF set ID from fields 425, 430, 435, 440, 445 and 450 from the routing binding header 418.

Figure 13A:
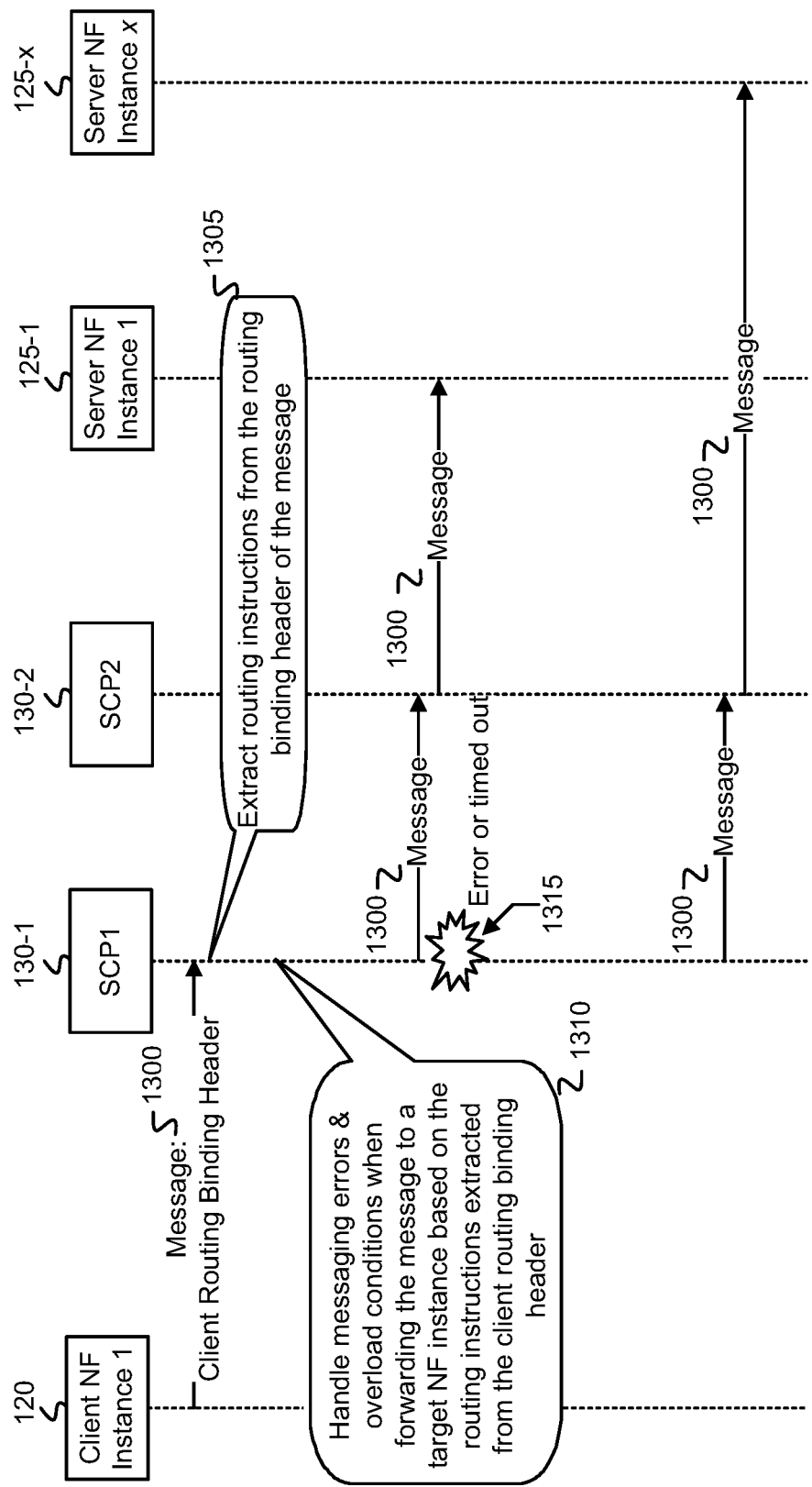
FIGS. 13A and 13B depict exemplary operations, messages, and data flows associated with an exemplary process.

A "routing binding header," as referred to herein, includes a routing binding header 418 included in a message 400 sent from either a client NF instance 120 or a server NF instance 125. The purpose of the routing binding header is to instruct the receiving SCP 130 on how to handle instances of communication errors or timed out communications involving the target endpoint of the message when forwarding a message towards the target endpoint. A "client routing binding header" refers to a routing binding header that originated from a client NF instance 120, and a "server routing binding header" refers to a routing binding header that originated from a server NF instance 125. Client routing binding headers and server routing binding headers differ from the client binding headers and the server binding headers described above with respect to FIGS. 5, 8, 10A and 10B in that the routing binding headers instruct the intermediate proxy device that serves to route messages (e.g., a SCP(s) 130), instead of the client NF instance 120 or server NF instance 125, how to handle instances of communication errors or timed out communications. The client routing binding header may include binding header data extracted from a previous server binding header 415 in a message received from a server NF instance 125, such as the server response returned in block 825 of FIG. 8. The binding header data included in the client routing binding header, thus, instructs the receiving SCP 130 how to handle instances of communication errors or timed out communications, including the particular retry mode to be used, the number of retry attempts to perform, and/or whether to use an alternate transport route to reach a server NF instance 125 when forwarding a message towards a target server NF endpoint. FIG. 13A depicts a SCP1 130-1 receiving a message 1300, including a client routing binding header, from a client NF instance 120, that relates to an existing session between the client NF instance 120 and a server NF instance 125. FIG. 13A further shows SCP1 130-1 extracting 1305 routing instructions from the routing binding header of the received message 1300.

The SCP 130 subsequently handles messaging errors and overload conditions when forwarding the message to a target NF instance based on the routing instructions extracted from the client routing binding header (block 1210). When the SCP 130 forwards the message towards the target NF instance, and there is a messaging failure, the SCP 130 consults the contents of the client routing binding header received in the message to determine how to handle message retry attempts, including whether to determine a new target NF instance or determine an alternate transport route from the SCP 130 to the target NF instance. The SCP 130 identifies the binding level from field 425, the server NF instance 125 from field 430, and/or the server NF set from field 450 of the client routing binding header 418. The SCP 130 further identifies the target server NF instance 125's failover mode, maximum number of retries, and retry mode, from fields 435, 440, and 445 of the client routing binding header 418. The SCP 130 first forwards the received message 400 to the destination server NF instance 125 identified in the message destination header 410. If a messaging failure then occurs, the SCP 130 uses the NF failover mode, the retry mode, and the maximum number of retries from the client routing binding header data to determine the original target NF instance 125's failover mode, the retry mode to be used, and the maximum number of retries. The particular retry mode to be used determines whether the message should, after the messaging failure, be forwarded to an alternate target server NF instance 125 and/or whether the message should be forwarded from the SCP 130 using an alternate transport route. FIG. 13A shows SCP 130 handling 1310 messaging errors and overload conditions when forwarding the message to a target NF instance based on the routing instructions extracted from the client routing binding header. FIG. 13A further shows an example of a SCP1 130-1 forwarding the message 1300 from the originating client NF instance 120 to the destination server NF instance 125-1. If, as shown in FIG. 13A, an error occurs 1315 or the message is timed out, the SCP1 130-1 may, based on the NF failover mode, the retry mode, and the maximum number of retries obtained in block 1205, forward the message 1300 to an alternate server NF instance 125-x.

Figure 13B:
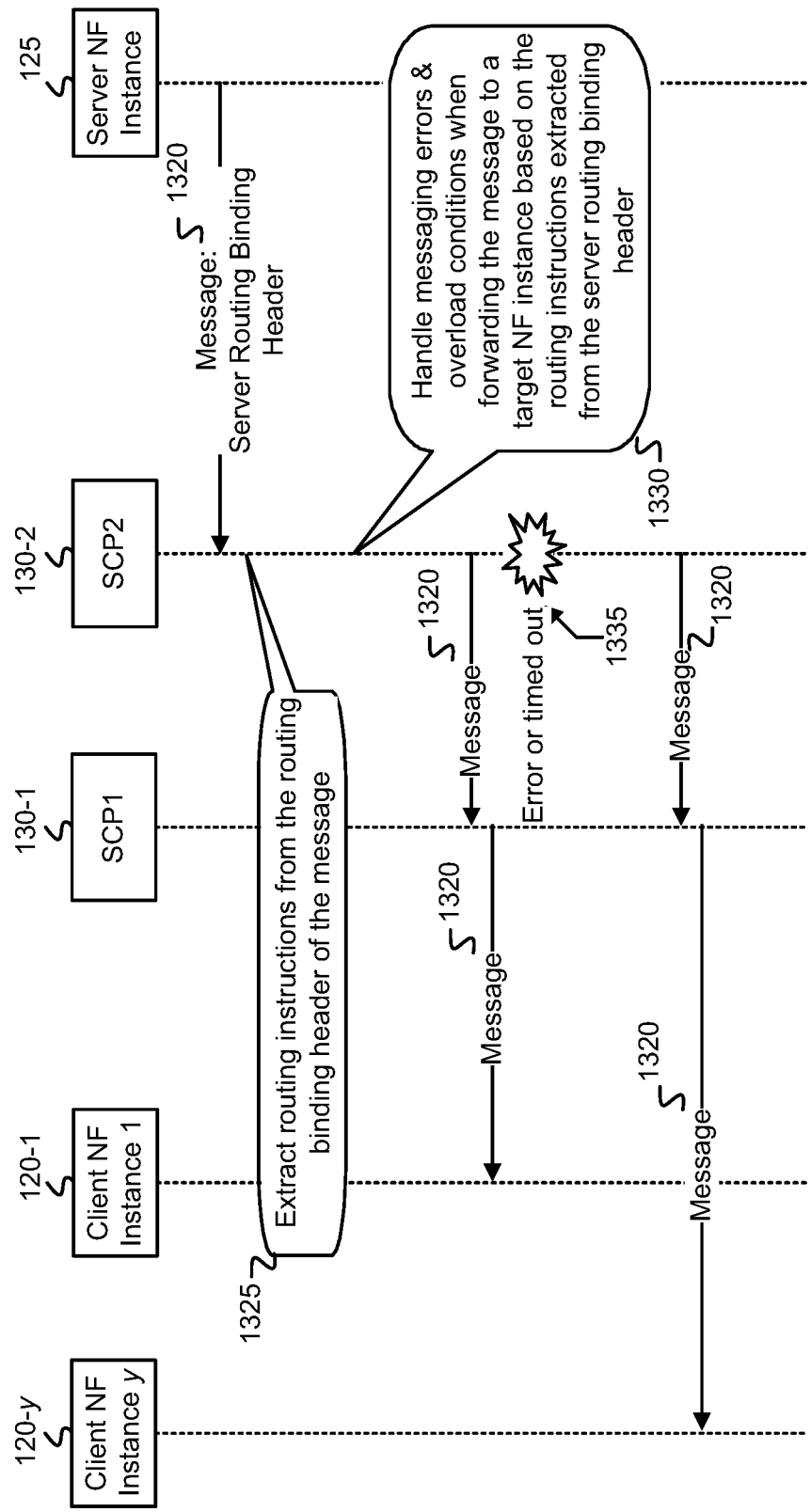

The SCP 130 receives, from a server NF instance 125, a message associated with the session that includes a server routing binding header (block 1215) and extracts routing instructions from the server routing binding header of the message (block 1220). The SCP 130 receives a message 400 that includes a message destination header 410 and a routing binding header 418. The SCP 130 may extract the ID or network address of the destination client NF instance 120 from message destination header 410 and the binding level, NF target, NF failover mode, number of retries, retry mode, and NF set ID from fields 425, 430, 435, 440, 445 and 450 from the server routing binding header 418. The server routing binding header may include binding header data extracted by the server NF instance 125 from a previous client binding header 415 contained in a message received by the server NF instance 125 from a client NF instance 120, such as the initial request message sent in block 510 of FIG. 5. The data included in the server routing binding header instructs the receiving SCP 130 how to handle instances of communication errors or timed out communications, including the particular retry mode to be used, the number of retry attempts to perform and/or whether to use an alternate transport route to reach a client NF instance 120. FIG. 13B shows a SCP2 130-2 receiving a message 1320, that includes a server routing binding header, from a server NF instance 125 that relates to an existing session between the server NF instance 125 and a client NF instance 120. FIG. 13B further shows SCP2 130-2 extracting 1325 routing instructions from the routing binding header of the received message 1320.

The SCP 130 subsequently handles messaging errors and overload conditions when forwarding the message to a target NF instance based on the routing instructions extracted from the server routing binding header (block 1225). When the SCP 130 forwards the message towards the target client NF instance, and there is a messaging failure, the SCP 130 consults the contents of the server routing binding header received in the message to determine how to handle message retry attempts, including whether to determine a new target client NF instance or determine an alternate transport route from the SCP 130 to the target client NF instance. The SCP 130 identifies the binding level from field 425, the client NF instance 120 from field 430, the client NF set from field 450 of the server routing binding header 418. The SCP 130 further identifies the client NF instance 120's failover mode, maximum number of retries, and retry mode, from fields 435, 440, and 445 of the server routing binding header 418. The SCP 130 first forwards the received message 400 to the destination client NF instance 125 identified in the message destination header 410. If a messaging failure then occurs, the SCP 130 uses the NF failover mode, the retry mode, and the maximum number of retries from the server routing binding header data to determine the original target NF instance 125's failover mode, the retry mode to be used, and the maximum number of retries. The particular retry mode to be used determines whether the message should, after the messaging failure, be forwarded to an alternate target server NF instance 125 and/or whether the message should be forwarded from the SCP 130 using an alternate transport route. FIG. 13B shows SCP 130 handling 1330 messaging errors and overload conditions when forwarding the message to a target NF instance based on the routing instructions extracted from the server routing binding header. FIG. 13B further shows an example of a SCP2 130-2 forwarding the message 1320 from the originating server NF instance 125 to the destination client NF instance 120-1. If, as shown in FIG. 13B, an error occurs 1335 or the message is timed out, the SCP2 130-2 may, based on the NF failover mode, the retry mode, and the maximum number of retries obtained in block 1220, forward the message 1320 to an alternate client NF instance 120-y.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5, 8, 10A, 10B, and 12, and sequences of operations, messages, and/or data flows with respect to FIGS. 7, 9, 11A, 11B, 13A, and 13B, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 320) of a device. A non-transitory storage medium includes one or more of the storage mediums described in relation to memory 330. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
sending, from a first network function (NF) instance, a first request for a session to a second NF instance;
receiving a response, at the first NF instance from the second NF instance, that includes a binding header, wherein the binding header comprises a failover mode identifier, a designated number of retry attempts, and a retry mode;
sending, from the first NF instance, a second request for the session to the second NF instance;
determining, by the first NF instance, if an error or a timed out response has occurred subsequent to sending the second request; and
re-sending, in response to the error or timed out response, the second request based on the failover mode identifier, the designated number of retry attempts, and the retry mode from the binding header.

2. The method of claim 1, wherein the failover mode identifier identifies whether the second NF instance operates in active-active failover mode or active-standby failover mode.

3. The method of claim 1, wherein the retry mode indicates a particular sequence of messaging retry attempts to be performed by the first NF instance upon an occurrence of an error or a timed out response.

4. The method of claim 1, wherein re-sending the second request or the command comprises:
when the retry mode comprises a first retry mode:
determining a different transport route to the second NF instance as a target NF instance for a first retry and re-sending the second request to the second NF instance via the different transport route for the first retry, and
selecting a new NF instance as the target NF instance for second and subsequent retries that do not exceed the designated number of retry attempts and re-sending the second request to the new NF instance; or
when the retry mode comprises a second retry mode:

determining a different transport route from the first NF instance to the second NF instance and re-sending the second request to the second NF instance via the different transport route.

5. The method of claim 1, wherein the second NF instance is a member of a NF set and wherein the retry mode indicates a particular sequence of messaging retry attempts to re-send the second request to the second NF instance or to other NF instances within the NF set.

6. The method of claim 1, wherein the second NF instance and a third NF instance are members of a NF set and wherein each member of the NF set is considered equivalent and interchangeable for performing a function, operation, or a service.

7. The method of claim 6, wherein the binding header further comprises at least one of a NF instance identifier or a NF set identifier and wherein the NF set identifier uniquely identifies the NF set.

8. The method of claim 1, further comprising:
extracting the failover mode identifier, the designated number of retry attempts and the retry mode, as binding header data, from the binding header;
storing, by the client NF instance, the binding header data in memory for the session; and
using the stored binding header data for re-sending the second request and subsequent requests or commands for the session.

9. A device implementing a first network function (NF) instance, comprising:
a communication interface coupled to a network to:
send, by the first NF instance, a first request for a session to a second NF instance;
receive a response, from the second NF instance, that includes a binding header, wherein the binding header comprises a failover mode identifier, a designated number of retry attempts, and a retry mode;
send, by the first NF instance, a second request for the session to the second NF instance; and
a processor or logic configured to:
determine if an error or a timed out response has occurred subsequent to sending the second request or the command to the second NF instance; and
re-send, via the communication interface in response to the error or timed out response, the second request based on the failover mode identifier, the designated number of retry attempts and the retry mode from the binding header.

10. The device of claim 9, wherein the failover mode identifier identifies whether the second NF instance operates in active-active failover mode or active-standby failover mode.

11. The device of claim 9, wherein the retry mode indicates a particular sequence of messaging retry attempts to be performed by the first NF instance upon an occurrence of an error or a timed out response.

12. The device of claim 9, wherein, when re-sending the second request or the command, the processor or logic is further configured to:
when the retry mode comprises a first retry mode:
determine a different transport route to the second NF instance as a target NF instance for a first retry and re-send the second request to the second NF instance via the different transport route for the first retry, and select a new NF instance as the target NF instance for second and subsequent retries that do not exceed the designated number of retry attempts and re-send the second request to the new NF instance; or when the retry mode comprises a second retry mode:
determine a different transport route from the first NF instance to the second NF instance and re-send the second request to the second NF instance via the different transport route.

13. The device of claim 9, wherein the second NF instance is a member of a NF set and wherein the retry mode indicates a particular sequence of messaging retry attempts to re-send the second request to the second NF instance or to other NF instances within the NF set.

14. The device of claim 9, wherein the second NF instance and a third NF instance are members of a NF set and wherein each member of the NF set is considered equivalent and interchangeable for performing a function, operation, or a service.

15. The device of claim 14, wherein the binding header further comprises at least one of a NF instance identifier or a NF set identifier and wherein the NF set identifier uniquely identifies the NF set.

16. The device of claim 9, wherein the process or logic is further configured to:
extract the failover mode identifier, the designated number of retry attempts and the retry mode, as binding header data, from the binding header;
store, by the client NF instance, the binding header data in memory for the session; and
use the stored binding header data for re-sending the second request, and subsequent requests or commands, for the session.

17. A non-transitory storage medium storing instructions executable by a device implementing a first network function (NF) instance, wherein the instructions comprise instructions to cause the device to:
send, from the first NF instance, a first request for a session to a second NF instance;
receive a response, from the second NF instance, that includes a binding header, wherein the binding header comprises a failover mode identifier, a designated number of retry attempts, and a retry mode;
send, from the first NF instance, a second request for the session to the second NF instance;
determine, by the first NF instance, if an error or a timed out response has occurred subsequent to sending the second request; and
re-send, in response to the error or timed out response, the second request based on the failover mode identifier, the designated number of retry attempts and the retry mode from the binding header.

18. The non-transitory storage medium of claim 17, wherein the failover mode identifier identifies whether the second NF instance operates in active-active failover mode or active-standby failover mode.

19. The non-transitory storage medium of claim 17, wherein the retry mode indicates a particular sequence of messaging retry attempts to be performed by the first NF instance upon an error or a timed out response.

20. The non-transitory storage medium of claim 17, wherein the instructions to cause the device to re-send the second request or the command further comprise instructions to cause the device to:
when the retry mode comprises a first retry mode:
determine a different transport route to the second NF instance as a target NF instance for a first retry and re-send the second request or command to the second NF instance via the different transport route for the first retry, and select a new NF instance as the target NF instance for second and subsequent retries that do not exceed the designated number of retry attempts and re-send the second request or command to the new NF instance; or when the retry mode comprises a second retry mode:
determine a different transport route from the first NF instance to the second NF instance and re-send the second request to the second NF instance via the different transport route.

* * * * *